United States Patent
Ding et al.

(10) Patent No.: US 12,333,291 B2
(45) Date of Patent: Jun. 17, 2025

(54) VOICE SCENE UPDATE METHOD AND DEVICE, TERMINAL, SERVER AND SYSTEM

(71) Applicants: HUMAN HORIZONS (SHANGHAI) NEW ENERGY POWERTRAIN TECHNOLOGY CO., LTD., Shanghai (CN); HUMAN HORIZONS (SHANGHAI) CLOUD COMPUTING TECHNOLOGY CO., LTD., Shanghai (CN)

(72) Inventors: Lei Ding, Shanghai (CN); Chao Wang, Shanghai (CN)

(73) Assignees: HUMAN HORIZONS (SHANGHAI) NEW ENERGY POWERTRAIN TECHNOLOGY CO., LTD., Shanghai (CN); HUMAN HORIZONS (SHANGHAI) CLOUD COMPUTING TECHNOLOGY CO., LTD., Shanghai (CN)

(*) Notice: Subject to any disclaimer, the term of this patent is extended or adjusted under 35 U.S.C. 154(b) by 262 days.

(21) Appl. No.: 18/011,104

(22) PCT Filed: Mar. 25, 2021

(86) PCT No.: PCT/CN2021/083041
§ 371 (c)(1),
(2) Date: Dec. 16, 2022

(87) PCT Pub. No.: WO2021/253910
PCT Pub. Date: Dec. 23, 2021

(65) Prior Publication Data
US 2023/0297362 A1    Sep. 21, 2023

(30) Foreign Application Priority Data
Jun. 18, 2020 (CN) ......................... 202010556638.9

(51) Int. Cl.
G06F 8/65        (2018.01)
H04L 67/1095     (2022.01)
H04L 67/12       (2022.01)

(52) U.S. Cl.
CPC ............ G06F 8/65 (2013.01); H04L 67/1095 (2013.01); H04L 67/12 (2013.01)

(58) Field of Classification Search
CPC ....... G06F 8/65; G06F 3/167; H04L 67/1095; H04L 67/12
See application file for complete search history.

(56) References Cited

U.S. PATENT DOCUMENTS 10,474,450 B1    11/2019  Chim et al.
10,831,744 B1*   11/2020  Harris ................... G06F 16/219
2017/0242674 A1*  8/2017  Hussein ................. H04L 67/12

FOREIGN PATENT DOCUMENTS

CN    107332867 A    11/2017
CN    109471653 A    3/2019
(Continued)

OTHER PUBLICATIONS

Feng; Translated CN 110381155 A (Year: 2019).*
(Continued)

*Primary Examiner* — S. Sough
*Assistant Examiner* — Cuong V Luu
(74) *Attorney, Agent, or Firm* — Burris Law, PLLC

(57) ABSTRACT

The present application provides a voice scene update method, including: sending an update request to a cloud, the update request enables the cloud to obtain version information of vehicle voice scene data and version information of at least one piece of cloud voice scene data in real time to determine whether updatable voice scene data exists or not and determine target voice scene data when the updatable voice scene data exists, the at least one piece of cloud voice
(Continued)

scene data includes new-version cloud voice scene data obtained by updating original-version cloud voice scene data based on no-feedback voice information, and the no-feedback voice information is a voice that no feedback is capable of being given for based on the vehicle voice scene data; receiving the target voice scene data returned by the cloud; and updating the vehicle voice scene data into the target voice scene data.

12 Claims, 11 Drawing Sheets

(56) References Cited

FOREIGN PATENT DOCUMENTS

| CN | 109992248 A | | 7/2019 | |
| CN | 110381155 A | * | 10/2019 | ......... H04L 67/1095 |
| CN | 111274433 A | | 6/2020 | |
| CN | 111464977 A | | 7/2020 | |
| JP | 2011039202 A | | 2/2011 | |

OTHER PUBLICATIONS

Minh Duc Vu et al.; Voicify Your UI: Towards Android App Control with Voice Commands; ACM; 22 pages; retrieved on Jan. 30, 2025 (Year: 2023).*

International Search Report issued in corresponding International Application No. PCT/CN2021/083041, mailed Jun. 2, 2021 and English Translation, 5 pages.

Written Opinion issued in corresponding International Application No. PCT/CN2021/083041, mailed Jun. 2, 2021 and English Translation, 9 pages.

Search Report issued in corresponding CN Application No. 20201055663.9, issued Jun. 18, 2020.

Extended European Search Report issued in corresponding European Application No. EP21824938.1, mailed Jul. 5, 2024, 33 pages.

* cited by examiner

VOICE SCENE UPDATE METHOD AND DEVICE, TERMINAL, SERVER AND SYSTEM

CROSS-REFERENCE TO RELATED APPLICATIONS

This application is a U.S. National Phase Application of PCT/CN2021/083041 filed Mar. 25, 2021, which claims priority to Chinese Patent Application No. 202010556638.9, filed on Jun. 18, 2020, in China National Intellectual Property Administration and entitled "Voice Scene Update Method and Device, Terminal, Server, and System", the contents of which are hereby incorporated by reference in their entirety.

FIELD

The present application relates to the technical field of vehicles, and particularly to a voice scene update method and device, a terminal, a server, and a system.

BACKGROUND

Currently, vehicles are mostly updated on line by Over the Air (OTA) mainly as follows: the vehicle downloads an upgrade packet on line and installs the upgrade packet locally to supersede an old-version software to update. OTA upgrade implements full-system upgrade of an operating system, firmware (including vehicle parts and components, such as seats and lights of a vehicle), drive system, vehicle software programs, etc., of the vehicle, and is long in development time and high in development cost. For example, the development time of data packets required for each upgrade is at least half a year, while the development cost is tens of millions. As a result, the vehicle may not be updated frequently, and the update efficiency and update supersedence speed of the vehicle are low. However, voice scene data to be updated is usually written in an upgrade packet, so the voice scene update efficiency and supersedence speed are low.

SUMMARY

Embodiments of the present application provide a voice scene update method and device, a terminal, a server, and a system, so as to solve the problems in the related art. The following technical solutions are used.

In a first aspect, the embodiments of the present application provide a voice scene update method, applied to a vehicle and including:
  sending an update request to a cloud, wherein the update request includes a vehicle identifier, and the update request is used for enabling the cloud to obtain version information of vehicle voice scene data and version information of at least one piece of cloud voice scene data to determine whether updatable voice scene data exists or not and determine target voice scene data under a condition that the updatable voice scene data exists;
  receiving the target voice scene data returned by the cloud; and
  updating the vehicle voice scene data into the target voice scene data.

In a second aspect, the embodiments of the present application provide a voice scene update method, applied to a cloud and including:
  receiving an update request sent by a vehicle, wherein the update request includes a vehicle identifier;
  obtaining version information of vehicle voice scene data and version information of at least one piece of cloud voice scene data according to the update request;
  determining whether the updatable voice scene data exists or not based on the version information of the vehicle voice scene data and the version information of the at least one piece of the cloud voice scene data;
  determining target voice scene data under the condition that the updatable voice scene data exists; and
  sending the target voice scene data to the vehicle such that the vehicle updates the vehicle voice scene data into the target voice scene data.

In a third aspect, the embodiments of the present application provide a voice scene update method, applied to a vehicle and including:
  receiving an update event message sent by a cloud, wherein the update event message is generated by the cloud according to a target vehicle identifier determined according to a voice scene update rule which includes vehicle type information and a combination relationship of the vehicle type information, and the vehicle type information is in correspondence to a vehicle identifier; and
  triggering the method of any implementation mode in the first aspect to be executed according to the update event message.

In a fourth aspect, the embodiments of the present application provide a voice scene update method, applied to a cloud and including:
  determining a target vehicle identifier according to a voice scene update rule, wherein the voice scene update rule includes vehicle type information and a combination relationship of the vehicle type information, and the vehicle type information is in correspondence to a vehicle identifier;
  determining whether the updatable voice scene data exists or not according to the target vehicle identifier;
  generating an update event message corresponding to the target vehicle identifier under the condition that the updatable voice scene data exists; and
  pushing the update event message to a vehicle corresponding to the target vehicle identifier to trigger the cloud to execute the method of any implementation mode in the second aspect.

In a fifth aspect, the embodiments of the present application provide a voice scene update method, applied to a vehicle and including:
  receiving target voice scene data sent by a cloud, wherein the target voice scene data is determined by the cloud under a condition of determining that the updatable voice scene data exists after obtaining, under a condition of monitoring that the vehicle is on-line, version information of vehicle voice scene data and version information of at least one piece of cloud voice scene data to determine whether the updatable voice scene data exists or not; and updating the vehicle voice scene data into the target voice scene data.

In a sixth aspect, the embodiments of the present application provide a voice scene update method, applied to a cloud and including:
  obtaining, under the condition of monitoring that the vehicle is on-line, version information of vehicle voice scene data and version information of at least one piece of cloud voice scene data to determine whether the updatable voice scene data exists or not;

determining target voice scene data from the updatable voice scene data under the condition that the updatable voice scene data exists; and sending the target voice scene data to the vehicle corresponding to a target vehicle identifier such that the vehicle updates the vehicle voice scene data into the target voice scene data.

In a seventh aspect, the embodiments of the present application provide a voice scene update device, including:

an update request sending module, configured to send an update request to a cloud, wherein the update request includes a vehicle identifier, and the update request is used for enabling the cloud to obtain version information of vehicle voice scene data and version information of at least one piece of cloud voice scene data to determine whether updatable voice scene data exists or not and determine target voice scene data under a condition that the updatable voice scene data exists;

a target voice scene data receiving module, configured to receive the target voice scene data returned by the cloud; and a target voice scene data update module, configured to update the vehicle voice scene data into the target voice scene data.

In an eighth aspect, the embodiments of the present application provide a voice scene update device, including: an update request receiving module, configured to receive an update request sent by a vehicle, wherein the update request includes a vehicle identifier; a voice scene data obtaining module, configured to obtain version information of vehicle voice scene data and version information of at least one piece of cloud voice scene data according to the update request; an updatable voice scene data determining module, configured to determine whether the updatable voice scene data exists or not based on the version information of the vehicle voice scene data and the version information of the at least one piece of cloud voice scene data; a target voice scene data determining module, configured to determine target voice scene data under the condition that the updatable voice scene data exists; and a target voice scene data sending module, configured to send the target voice scene data to the vehicle such that the vehicle updates the vehicle voice scene data into the target voice scene data.

In a ninth aspect, the embodiments of the present application provide a voice scene update device, including: an update event message receiving module, configured to receive an update event message sent by a cloud, wherein the update event message is generated by the cloud according to a target vehicle identifier determined according to a voice scene update rule, the voice scene update rule includes vehicle type information and a combination relationship of the vehicle type information, and the vehicle type information is in correspondence to a vehicle identifier; and an execution triggering module, configured to trigger the method of any implementation mode in the first aspect to be executed according to the update event message.

In a tenth aspect, the embodiments of the present application provide a voice scene update device, including: a target vehicle identifier determining module, configured to determine a target vehicle identifier according to a voice scene update rule, wherein the voice scene update rule includes vehicle type information and a combination relationship of the vehicle type information, and the vehicle type information is in correspondence to a vehicle identifier; an updatable voice scene data determining module, configured to determine whether the updatable voice scene data exists or not according to the target vehicle identifier; an update event message generation module, configured to generate an update event message corresponding to the target vehicle identifier under the condition that the updatable voice scene data exists; and a pushing module, configured to push the update event message to a vehicle corresponding to the target vehicle identifier to trigger the cloud to execute the method of any implementation mode in the second aspect.

In an eleventh aspect, the embodiments of the present application provide a voice scene update device, including: a target voice scene data receiving module, configured to receive target voice scene data sent by a cloud, wherein the target voice scene data is determined by the cloud under a condition of determining that the updatable voice scene data exists after obtaining, under a condition of monitoring that a vehicle is on-line, version information of vehicle voice scene data and version information of at least one piece of cloud voice scene data to determine whether the updatable voice scene data exists or not; and a target voice scene data update module, configured to update the vehicle voice scene data into the target voice scene data.

In a twelfth aspect, the embodiments of the present application provide a voice scene update device, including: an updatable voice scene data determining module, configured to obtain, under the condition of monitoring that the vehicle is on-line, the version information of the vehicle voice scene data and the version information of the at least one piece of the cloud voice scene data to determine whether the updatable voice scene data exists or not; a target voice scene data determining module, configured to determine target voice scene data from the updatable voice scene data under the condition that the updatable voice scene data exists; and a target voice scene data sending module, configured to send the target voice scene data to the vehicle such that the vehicle updates the vehicle voice scene data into the target voice scene data.

In a thirteenth aspect, the embodiments of the present application provide a terminal, including: at least one processor; and a memory in communication connection with the at least one processor, wherein the memory stores instructions executable by the at least one processor, and the instructions are executed by the at least one processor to enable the at least one processor to execute the method of any implementation mode in the first aspect and the third aspect.

In a fourteenth aspect, the embodiments of the present application provide a server, including: at least one processor; and a memory in communication connection with the at least one processor, where the memory stores instructions executable by the at least one processor, and the instructions are executed by the at least one processor to enable the at least one processor to execute the method of any implementation mode in the second aspect and the fourth aspect.

In a fifteenth aspect, the embodiments of the present application provide a voice scene update system, including: a vehicle, configured to implement the method of any implementation mode in the first aspect, the third aspect, and the fifth aspect; and a cloud, configured to implement the method of any implementation mode in the second aspect, the fourth aspect, and the sixth aspect.

In a sixteenth aspect, the embodiments of the present application provide a computer-readable storage medium having stored therein a computer instruction executed by a processor to implement the method of any implementation mode in the first aspect to the sixth aspect.

The technical solutions have at least the following advantages or beneficial effects. The update request is sent to the cloud to actively request the cloud to determine in real time whether the updatable voice scene data exists or not according to the update request and determine and transmit the target voice scene data under the condition that the updatable voice scene data exists, and the vehicle voice scene data may further be updated in real time when the target voice scene data is received. As such, update of the voice scene data may be separated from update of an upgrade packet, and the voice scene data may be updated without waiting for completion of the upgrade packet. Therefore, the supersedence speed of the voice scene data, the updating efficiency, the updating timeliness, and user experience may be improved. In addition, the at least one piece of cloud voice scene data may be obtained by self-learning and updating of original-version cloud voice scene data based on no-feedback voice information, so that the cloud voice scene data is updated more adaptively, the update speed of the cloud voice scene data may be improved, and the updating efficiency may further be improved.

DETAILED DESCRIPTION

Only some exemplary embodiments are described simply below. As realized by those skilled in the art, the described embodiments may be modified in various manners without departing from the spirit or scope of the present application. Therefore, the drawings and the descriptions are considered to be substantially exemplary rather than restrictive.

Embodiment 1

Figure 1:
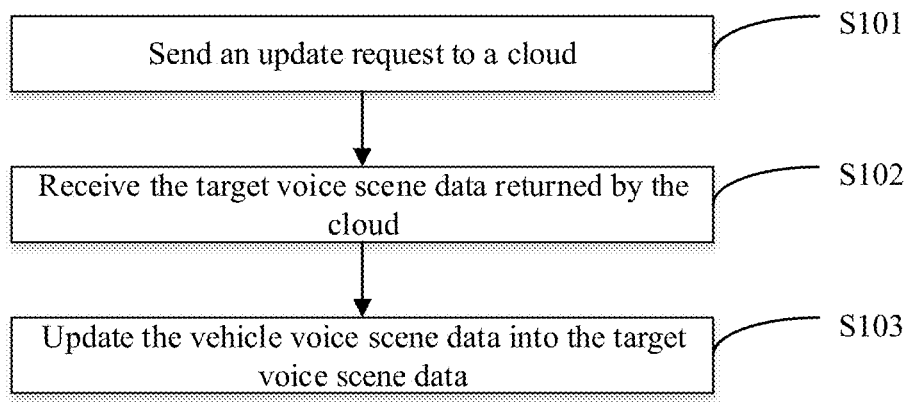
FIG. 1 is a schematic flowchart of a voice scene update method according to embodiment 1 of the present application.

FIG. 1 is a schematic flowchart of a voice scene update method according to embodiment 1 of the present application. As shown in FIG. 1, the voice scene update method may be applied to a vehicle and include the following steps.

In S101, an update request is sent to a cloud, wherein the update request includes a vehicle identifier, and the update request is used for enabling the cloud to obtain version information of vehicle voice scene data and version information of at least one piece of cloud voice scene data in real time to determine whether updatable voice scene data exists or not and determine target voice scene data under the condition that the updatable voice scene data exists.

The voice scene data may be used for representing a correspondence between voice information of a user and an interaction task. The correspondence may be a correspondence between the voice information of the user and feedback information for the voice information of the user, or a correspondence between the voice information of the user, a corresponding operation, and feedback information for the voice information of the user.

For example, the voice scene data may include navigation scene data. A correspondence in the navigation scene data may be a correspondence between voice information of the user "I want to look at the stars" and a synthetic voice "Entering the star mode for you" and a correspondence between voice information of the user "It's stuffy" and a synthetic voice "Opening the window to get some air for you", or a correspondence between voice information of the user "I want to look at the stars" and opening the sunroof of the vehicle as well as a synthetic voice "Entering the star mode for you" and a correspondence between voice information of the user "It's stuffy" and opening the side window of the vehicle as well as a synthetic voice "Opening the window to get some air for you".

In the embodiment of the present application, the vehicle may implement a corresponding voice conversation scene when having voice scene data of a certain type.

The vehicle voice scene data is used for representing voice scene data stored in the vehicle, which is one version of voice scene data.

The cloud voice scene data is used for representing voice scene data stored in the cloud. There is one or more pieces of cloud voice scene data.

The embodiment of the present application is particularly applied to a scene that there are multiple pieces of cloud voice scene data. Each piece of cloud voice scene data is voice scene data of one version, and all of the cloud voice scene data forms voice scene data of all versions. Moreover, different cloud voice scene data is of different versions.

The at least one piece of cloud voice scene data may include new-version cloud voice scene data obtained by updating original-version cloud voice scene data on the basis of no-feedback voice information. The no-feedback voice information is a voice that no feedback is capable of being given on the basis of the vehicle voice scene data.

For example, when the vehicle receives voice information of the user "I want to look at the stars" and may not give any feedback, the vehicle may label the voice information as a no-feedback voice. When obtaining "I want to look at the stars", the cloud may update original-version cloud voice scene data to obtain new-version cloud voice scene data, the new-version cloud voice scene data including a correspondence between the voice information of the user "I want to look at the stars" and an interaction task, so that the update speed of the cloud voice scene data may be improved. Then, the cloud may provide the new-version cloud voice scene data for the vehicle according to an update request, such that the vehicle may execute the corresponding interaction task when receiving the voice information "I want to look at the stars" next time or after a preset time threshold. Therefore, the supersedence speed of the vehicle voice scene data and the updating efficiency are further improved, and the vehicle is quickly endowed with a new voice conversation capability.

In an example, updating the original-version cloud voice scene data on the basis of the no-feedback voice information may include: performing self-learning using a scene data generation model on the basis of the no-feedback voice information to generate the new-version cloud voice scene data on the basis of the original-version cloud voice scene data. The scene data generation model is obtained by training a deep learning network model with multiple pieces of sample voice information. The deep learning network model may be one of a Recurrent Neural Network (RNN) model, a Deep Neural Network (DNN) model, a Convolutional Neural Network (CNN) model, and other neural network models.

The at least one cloud voice scene data may be generated on the basis of a voice scene flow edited by the user with a Visual Editor Project (VEP), and its format may be .xml, or others. Therefore, the user may generate the cloud voice scene data on the basis of the VEP for the vehicle to use for updating.

The version difference of voice scene data lies in that new-version voice scene data may include voice scene data of a new scene. For example, first-version voice scene data includes call scene data, while second-version voice scene data includes the call scene data and navigation scene data.

In such case, the vehicle has both a call scene conversation capability and a navigation scene conversation capability when the vehicle voice scene data is updated from the first-version voice scene data to the second-version voice scene data. It can be understood that the voice scene data may also be data of a music scene, a vehicle control scene, a frequency modulation receiving scene, a game scene, an information prompting scene, a weather query scene, and other vertical conversation scenes. The type of the voice scene data is not limited in the embodiment of the present application as long as a vertical conversation scene may be implemented.

The update request in step S101 may be sent to the cloud when the vehicle is powered on. Specifically, every time when powered on, the vehicle may actively request the cloud to determine whether the updatable voice scene data exists and determine and transmit target voice scene data under the condition that the updatable voice scene data exists, to implement update of the vehicle voice scene data.

In an example, under the condition that the vehicle is powered on, the vehicle voice scene data may be converted into executable voice scene data, and the executable voice scene data is stored in a scene container of the vehicle. Then, when voice information of the user is received, corresponding feedback information may be generated and output for the voice information of the user according to the executable voice scene data stored in the scene container of the vehicle.

For example, when the vehicle voice scene data includes navigation scene data, when powered on, the vehicle may convert the navigation scene data into executable navigation scene data and store the executable navigation scene data in the scene container of the vehicle. Further, if voice information of the user "I want to look at the stars" is received, a corresponding sunroof opening instruction may be generated according to the executable navigation scene data to open the sunroof of the vehicle. As such, the vehicle may implement voice scene interaction with the user timely when powered on. In addition, converting the vehicle voice scene data into the executable voice scene data and storing the executable voice scene data in the scene container of the vehicle under the condition that the vehicle is powered on may also avoid the vehicle repeatedly obtaining the data from the cloud when powered on next time, improving the updating efficiency.

In the present application, the vehicle identifier may be an identification code of the vehicle, such as a Vehicle Identification Number (VIN) or serial number of the vehicle, or an identification code in other forms, as long as the vehicle may be identified to be distinguished from other vehicles.

In S102, the target voice scene data returned by the cloud is received.

In S103, the vehicle voice scene data is updated into the target voice scene data.

According to the embodiment of the present application, the update request is sent to the cloud to actively request the cloud to determine in real time whether the updatable voice scene data exists or not according to the update request and determine and transmit the target voice scene data under the condition that the updatable voice scene data exists, and the vehicle may further update the vehicle voice scene data in real time when receiving the target voice scene data. As such, update of the voice scene data may be separated from update of an upgrade packet, and the voice scene data may be updated without waiting for completion of the upgrade packet. Therefore, the supersedence speed of the voice scene data, the updating efficiency, the updating timeliness, and user experience may be improved. In addition, the at least one piece of cloud voice scene data may be obtained by self-learning and updating of original-version cloud voice scene data on the basis of no-feedback voice information, so that the cloud voice scene data is updated more adaptively, the update speed of the cloud voice scene data may be improved, and the updating efficiency may further be improved.

It is to be noted that OTA upgrade implements full-system upgrade of all vehicle parts and components, and is long in development time and large in data size, so it is impossible to implement real-time update. In the voice scene update method of the embodiment of the present application, update of the voice scene data may be separated from update of the upgrade packet, so that update of the voice scene data involves a small data size. In addition, the cloud may determine whether the updatable voice scene data exists or not in real time and further determine the target voice scene data in real time, so as to provide the target voice scene data for updating for the vehicle in real time. Moreover, the source cloud voice scene data of the updatable voice scene data may be obtained by adaptive updating based on no-feedback voice information, and the update speed is high. Therefore, real-time update may be implemented by the voice scene update method of the embodiment of the present application.

Figure 2:
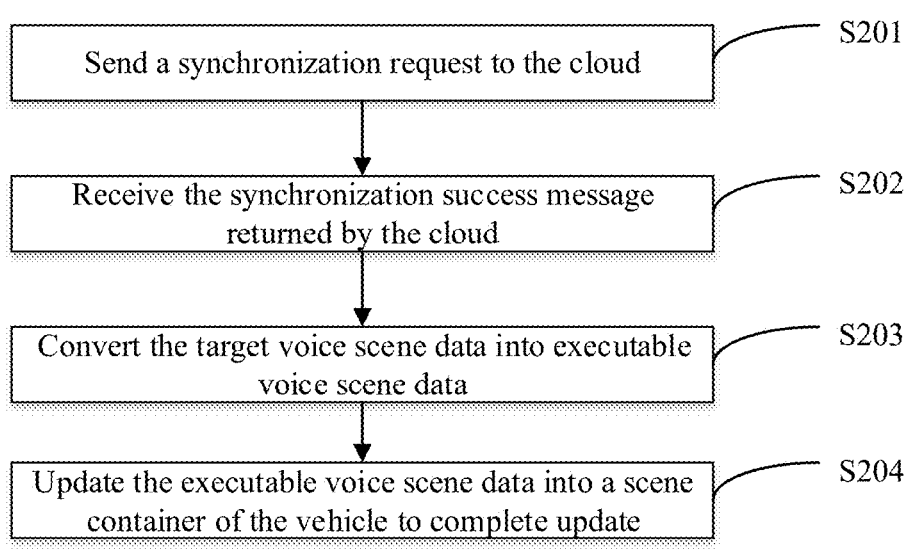
FIG. 2 is a schematic flowchart of step S103 in FIG. 1.

In an embodiment, as shown in FIG. 2, step S103 may include the following steps.

In S201, a synchronization request is sent to the cloud, wherein the synchronization request is used for enabling the cloud to update the version information of the vehicle voice scene data into that of the target voice scene data and generate a synchronization success message.

In an example, when receiving a synchronization request, the cloud queries version information of vehicle voice scene data corresponding to the synchronization request from a mapping relationship between a vehicle identifier and version information of vehicle voice scene data according to a vehicle identifier in the synchronization request to update the found version information of the vehicle voice scene data into that of the target voice scene data, and generates a synchronization success message.

In S202, the synchronization success message returned by the cloud is received.

In S202, the vehicle may trigger conversion of the target voice scene data when receiving the synchronization success message returned by the cloud.

In S203, the target voice scene data is converted into executable voice scene data.

In S204, the executable voice scene data is updated into a scene container of the vehicle to complete update.

Storing the executable voice scene data obtained by converting the target voice scene data in the scene container of the vehicle may replace original executable voice scene data to further implement update of the vehicle voice scene data, so as to obtain the executable voice scene data from the scene container of the vehicle for feedback when receiving the voice information of the user.

Figure 3:
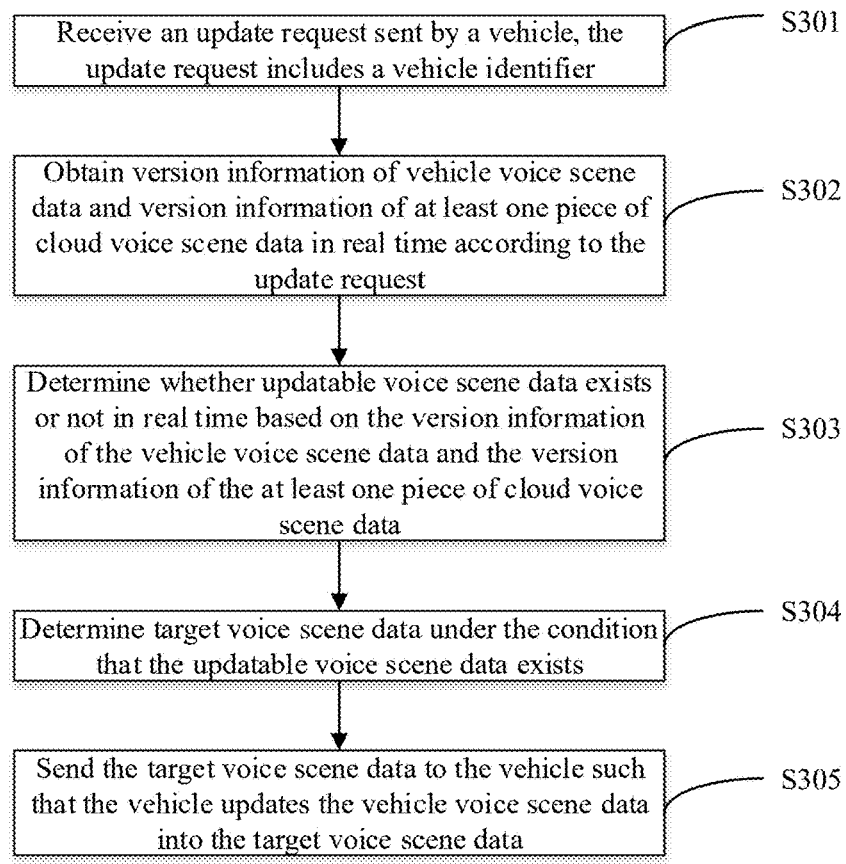
FIG. 3 is a schematic flowchart of another voice scene update method according to embodiment 1 of the present application.

Accordingly, embodiment 1 of the present application also provides another voice scene update method, which may be applied to a cloud. FIG. 3 is a schematic flowchart of another voice scene update method according to embodiment 1 of the present application. As shown in FIG. 3, the voice scene update method may include the following steps.

In S301, an update request sent by a vehicle is received, the update request including a vehicle identifier.

In S302, version information of vehicle voice scene data and version information of at least one piece of cloud voice scene data are obtained in real time according to the update request, wherein the at least one piece of cloud voice scene data includes new-version cloud voice scene data obtained by updating original-version cloud voice scene data on the basis of no-feedback voice information, and the no-feedback voice information is a voice that no feedback is capable of being given on the basis of the vehicle voice scene data.

In an embodiment, when receiving the update request, the cloud may query version information of vehicle voice scene data in real time according to the vehicle identifier in the update request, and obtain version information of at least one piece of cloud voice scene data according to the update request.

In an example, a mapping relationship between a vehicle identifier and vehicle voice scene data may be stored in a first database of the cloud such that the cloud may query version information of vehicle voice scene data. A mapping relationship between version information of cloud voice scene data and a cloud voice scene data path may also be stored in the first database of the cloud such that the cloud may obtain version information of cloud voice scene data accordingly. Since both version information of cloud voice scene data and version information of vehicle voice scene data may be obtained by the cloud, the efficiency of determining updatable voice scene data may be improved.

In an embodiment, a user may configure a white list and a blacklist through a VEP, where the white list is used for storing vehicle identifiers allowed to be updated, and the black list is used for storing vehicle identifiers not allowed to be updated. The step that version information of vehicle voice scene data and version information of at least one piece of cloud voice scene data are obtained according to the update request may include that: the version information of the vehicle voice scene data and the version information of the at least one piece of cloud voice scene data are obtained under the condition that the vehicle identifier is found in a white list; and/or, voice scene update is stopped under the condition that the vehicle identifier is found in a blacklist. Based on this, the user configures a white list to control a specified vehicle to be updated, and configures a blacklist to control a specified vehicle to stop update, so that update service is directionally provided for specified vehicles.

In S303, whether the updatable voice scene data exists or not is determined in real time on the basis of the version information of the vehicle voice scene data and the version information of the at least one piece of cloud voice scene data.

In an embodiment, the operation that the cloud determines whether updatable voice scene data exists may include that: the cloud voice scene data whose version information is newer than that of the vehicle voice scene data in the at least one piece of cloud voice scene data is determined as the updatable voice scene data.

In an example, the operation that the cloud voice scene data whose version information is newer than that of the vehicle voice scene data in the at least one piece of cloud voice scene data is determined as the updatable voice scene data may include that: the version information of the at least one piece of cloud voice scene data is compared with that of the vehicle voice scene data to determine whether version information newer than the version information of the vehicle voice scene data exists in the version information of the at least one piece of cloud voice scene data or not; and if the version information newer than the version information of the vehicle voice scene data exists, the cloud voice scene data corresponding to the newer version information is determined as the updatable voice scene data.

For example, the cloud voice scene data includes navigation/0_*_*/*.xml, navigation/1_*_*/*.xml, navigation/2_*_*/*.xml, and navigation/3_*_*/*.xml whose version information is 0, 1, 2, and 3, and the vehicle voice scene data is /navigation/0_*_*/*.xml whose version information is 0. The version information of the cloud voice scene data and the vehicle voice scene data is compared to determine that version information newer than the version information of the vehicle voice scene data is 1, 2, and 3. Further, the cloud voice scene data corresponding to the newer version information navigation/1_*_*/*.xml, navigation/2_*_*/*.xml, and navigation/3_*_*/*.xml may be determined as updatable voice scene data.

In an example, the version information of the vehicle voice scene data and the version information of the cloud voice scene data may include two version numbers, wherein the first version number may be used for representing an original version of the voice scene data, and the second version number may be used for representing update of the version corresponding to the first version number to a version corresponding to the second version number. That is, the first version number and the second version number may be used for representing update of the voice scene data from the version corresponding to the first version number to the version corresponding to the second version number, so as to trace newer versions of the vehicle voice scene data and the cloud voice scene data to improve the maintenance efficiency of the voice scene data.

Under the condition that the version information of the vehicle voice scene data and the version information of the cloud voice scene data include two version numbers, the operation that the cloud voice scene data whose version information is newer than that of the vehicle voice scene data in the at least one piece of cloud voice scene data is determined as the updatable voice scene data may include that: the second version number of the at least one piece of cloud voice scene data is compared with that of the vehicle voice scene data to determine whether a version number greater than the second version number of the vehicle voice scene data exists in the second version number of the at least one piece of cloud voice scene data or not; and if the version number greater than the second version number of the vehicle voice scene data exists, the cloud voice scene data corresponding to the greater version number is determined as the updatable voice scene data.

For example, the cloud voice scene data includes navigation/0_1_*_*/*.xml, navigation/1_2_*_*/*.xml, navigation/1_3_*_*/*.xml, and navigation/0_4_*_*/*.xml whose second version numbers are 1, 2, 3, and 4, and the vehicle voice scene data is navigation/0_1_*_*/*.xml whose second version number is 1. The second version numbers of the cloud voice scene data and the vehicle voice scene data are compared to determine that the version numbers greater than that of the vehicle voice scene data in the second version numbers of the cloud voice scene data are 2, 3, and 4. Further, the corresponding cloud voice scene data navigation/1_2_*_*/*.xml, navigation/1_3_*_*/*.xml, and navigation/0_4_*_*/*.xml may be determined as updatable voice scene data.

In S304, target voice scene data is determined under the condition that the updatable voice scene data exists.

In an embodiment, the step that target voice scene data is determined may include that: the target voice scene data is determined from the updatable voice scene data.

In an example, the target voice scene data may be determined from the updatable voice scene data by determining any one of the updatable voice scene data as target voice scene data. For example, any one of the above-mentioned updatable voice scene data navigation/1_*_*/*.xml, navigation/2_*_*/*.xml, and navigation/3_*_*/*.xml may be determined as the target voice scene data. Therefore, the target voice scene data may be determined flexibly as practically required.

In an example, the target voice scene data may be determined by determining the updatable voice scene data with newest version information in the updatable voice scene data as the target voice scene data. For example, navigation/3_*_*/*.xml in the above-mentioned updatable voice scene data navigation/1_*_*/*.xml, navigation/2_*_*/*.xml, and navigation/3_*_*/*.xml is determined as the target voice scene data. Therefore, the latest version of the updatable voice scene data may be provided for the vehicle to implement cross-version update and improve the updating efficiency.

In an example, when the version information includes two version numbers, the target voice scene data may be determined from the updatable voice scene data by determining the updatable voice scene data whose second version number is greatest and first version number is the same as the second version number of the vehicle voice scene data in the updatable voice scene data as the target voice scene data. For example, when the determined updatable voice scene data is navigation/1_2_*_*/*.xml, navigation/1_3_*_*/*.xml, and navigation/0_4_*_*/*.xml, and the version information of the vehicle voice scene data is 0_1, navigation/1_3_*_*/*.xml may be determined as the target voice scene data. Therefore, the vehicle voice scene data may be updated from voice scene data of a specified version to voice scene data of another specified version, improving the updating accuracy.

Since the target voice scene data continues to be determined only when the updatable voice scene data exists, the running efficiency of the cloud may be improved. In addition, the target voice scene data may be determined directly from the updatable voice scene data, so the efficiency of determining the target voice scene data may be improved.

In S305, the target voice scene data is sent to the vehicle such that the vehicle updates the vehicle voice scene data into the target voice scene data.

According to the embodiment of the present application, the cloud may determine in real time whether the updatable voice scene data exists or not according to the update request sent by the vehicle, and continue to determine and send, to the vehicle, the target voice scene data under the condition that the updatable voice scene data exists. In this manner, the cloud may separate update of the voice scene data from update of an upgrade packet to provide the voice scene data for the vehicle, so update of the voice scene data is separated from update of the upgrade packet of the vehicle, and the voice scene data may be updated without waiting for completion of the upgrade packet. Therefore, the supersedence speed of the voice scene data, the updating efficiency, the updating timeliness, and user experience may be improved. In addition, the at least one piece of cloud voice scene data may be obtained by self-learning and updating of original-version cloud voice scene data on the basis of no-feedback voice information, so that the cloud voice scene data is updated more adaptively, the update speed of the cloud voice scene data may be improved, and the updating efficiency may further be improved.

Figure 4:
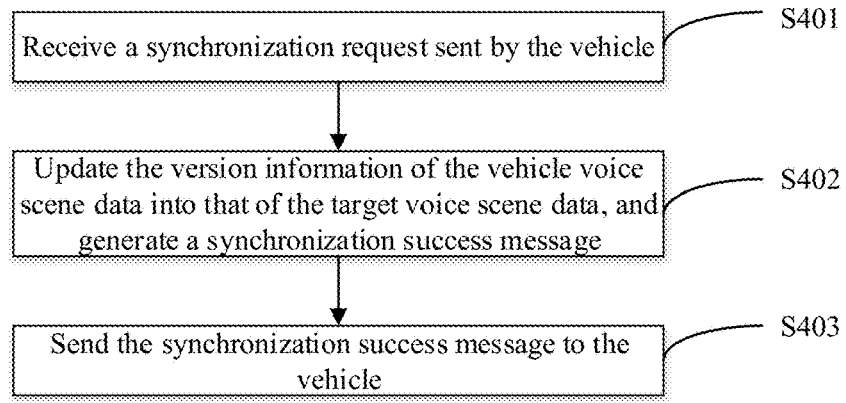
FIG. 4 is a schematic flowchart of yet another voice scene update method according to embodiment 1 of the present application.

In another embodiment, as shown in FIG. 4, after step S305, the voice scene update method may further include the following steps.

In S401, a synchronization request sent by the vehicle is received.

In S402, the version information of the vehicle voice scene data is updated into that of the target voice scene data, and a synchronization success message is generated.

The synchronization request may include a vehicle identifier. Step S402 may include that: the version information of the vehicle voice scene data is queried from a mapping relationship between a vehicle identifier and version information of vehicle voice scene data according to the vehicle identifier; and the version information of the vehicle voice scene data in the mapping relationship is updated into that of the target voice scene data.

In S403, the synchronization success message is sent to the vehicle, wherein the synchronization success message is used for enabling the vehicle to convert the target voice scene data into executable voice scene data.

Based on this, the mapping relationship between the vehicle identifier and the version information of the vehicle voice scene data may be synchronized with update of the vehicle voice scene data, so as to accurately determine whether updatable voice scene data exists or not on the basis of version information of vehicle voice scene data during next update, avoiding mistaken update.

Figure 5:
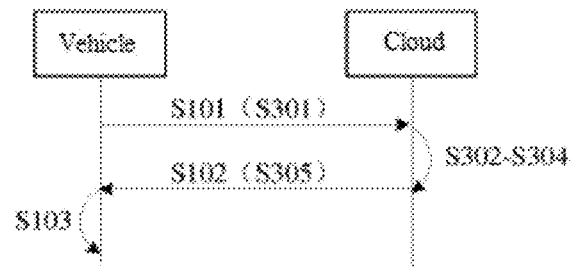
FIG. 5 is a schematic flowchart of interaction between a vehicle and a cloud in an implementation mode according to embodiment 1 of the present application.

FIG. 5 is a schematic flowchart of interaction between a vehicle and a cloud in embodiment 1 of the present application. Some specific embodiments of an interaction method between the vehicle and the cloud may refer to the description of the above-mentioned voice scene update method in combination with FIGS. 1, 3, and 5, and will not be elaborated herein.

Figure 6:
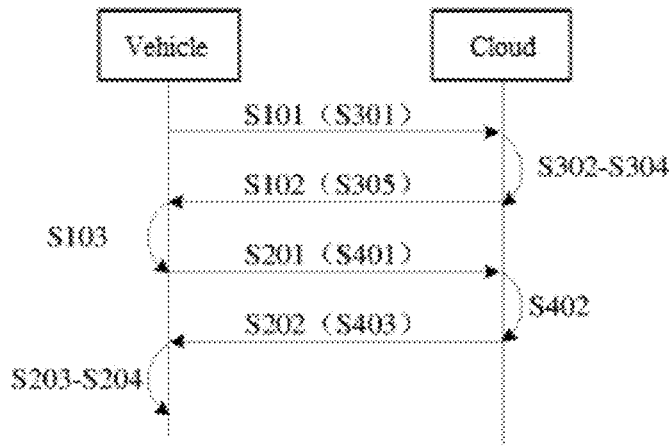
FIG. 6 is a schematic flowchart of interaction between a vehicle and a cloud in another implementation mode according to embodiment 1 of the present application.

FIG. 6 is another schematic flowchart of interaction between a vehicle and a cloud in embodiment 1 of the present application. Some specific embodiments of an interaction method between the vehicle and the cloud may refer to the description of the above-mentioned voice scene update method in combination with FIGS. 1 to 4, and 6, and will not be elaborated herein.

Embodiment 2

In the method in embodiment 2 of the present application, a cloud triggers a vehicle to update vehicle voice scene data. Implementation modes of embodiment 2 of the present application will be specifically described below, and technical details that are not described in detail may refer to the above-mentioned embodiment.

Figure 7:
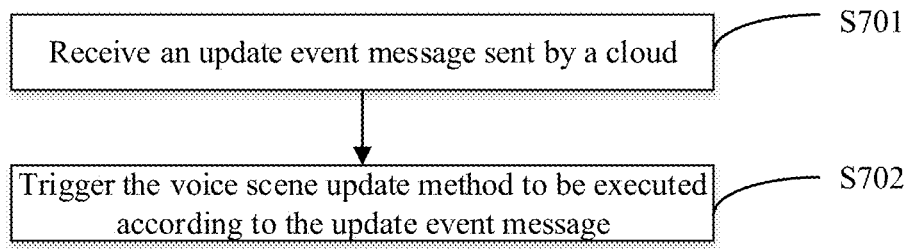
FIG. 7 is a schematic flowchart of a voice scene update method according to embodiment 2 of the present application.

FIG. 7 is a schematic flowchart of a voice scene update method according to embodiment 2 of the present application. As shown in FIG. 7, the method may include the following steps.

In S701, an update event message sent by a cloud is received, wherein the update event message is generated by the cloud according to a target vehicle identifier determined according to a voice scene update rule, the voice scene update rule includes vehicle type information and a combination relationship of the vehicle type information, and the vehicle type information is in correspondence to a vehicle identifier.

In an example, the vehicle type information may be a vehicle model, vehicle series, a system type used by the vehicle, user information (such as the age of the user and the occupation of the user) corresponding to the vehicle, a geographic region where the vehicle is located, etc. The vehicle type information is not limited in the embodiment of the present application.

In an example, the combination relationship may be a logical relationship such as AND, OR, and NOT, or a relationship of selecting one from multiple pieces of vehicle type information. The combination relationship is not limited in the embodiment of the present application as long as combination of the vehicle type information may be implemented.

In an example, the voice scene update rule may be generated on the basis of preset vehicle type information and a preset combination relationship. For example, the preset vehicle type information may be that the vehicle model is VX1 and the system type used by the vehicle is Android8.0, and the preset combination relationship is logical AND. In such case, the generated update rule is updating vehicles whose vehicle models are VX1 and that use the system of Android8.0.

Since the vehicle type information is in correspondence to a vehicle identifier, the vehicle identifier corresponding to the vehicle type information may be determined according to the vehicle type information, and a target vehicle identifier is further determined according to the logical combination relationship. For example, VX1 corresponds to vehicle identifiers VIN1, VIN2, and VIN3, and Android8.0 corresponds to vehicle identifiers VIN1, VIN2, and VIN4, so it may be determined according to logical AND that VIN1 and VIN2 are target vehicle identifiers.

Exemplarily, generation of the update event message by the cloud according to the target vehicle identifier determined according to the voice scene update rule may include:
determining whether the updatable voice scene data exists or not according to the target vehicle identifier; and
generating the update event message corresponding to the target vehicle identifier under the condition that the updatable voice scene data exists.

Some specific embodiments of determining whether the updatable voice scene data exists or not may refer to the descriptions in the above-mentioned embodiment, and will not be elaborated herein.

In S702, the voice scene update method of any above-mentioned implementation mode is triggered to be executed according to the update event message.

For example, in step S702, steps S101 to S103 may be triggered to be executed, or the other voice scene update method in the above-mentioned implementation modes may be triggered to be executed. Some specific embodiments of the voice scene update method triggered to be executed in step S702 may refer to the descriptions in embodiment 1, and will not be elaborated herein.

According to the voice scene update method of the embodiment of the present application, the cloud may determine the target vehicle identifier according to the voice scene update rule, and may further generate and send, to the vehicle, the update event message according to the target vehicle identifier to trigger the vehicle to timely perform vehicle voice scene data update according to the update event message without waiting for the vehicle being powered on. Therefore, the updating efficiency may further be improved.

Figure 8:
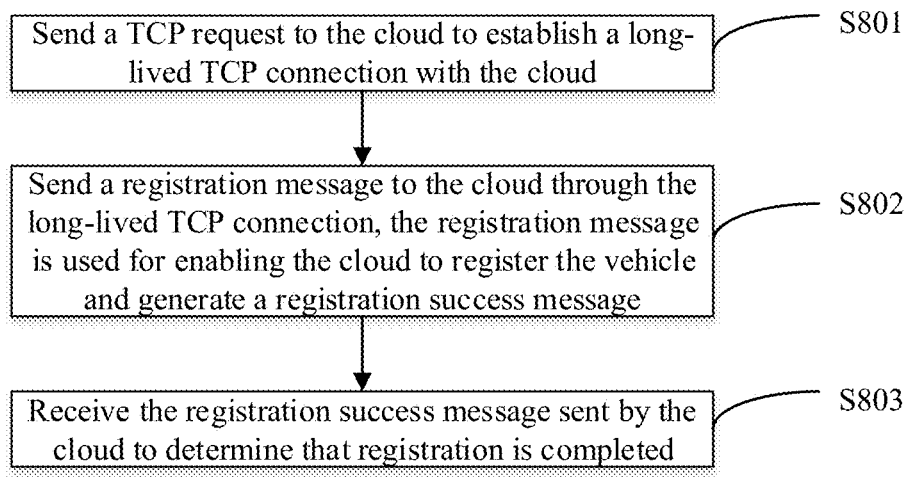
FIG. 8 is a schematic flowchart of Transmission Control Protocol (TCP) connection in an implementation mode according to embodiment 2 of the present application.

In an modembodiment, as shown in FIG. 8, before the step that an update event message sent by a cloud is received, the method may further include the following steps.

In S801, a TCP request is sent to the cloud to establish a long-lived TCP connection with the cloud.

In S802, a registration message is sent to the cloud through the long-lived TCP connection, wherein the registration message is used for enabling the cloud to register the vehicle and generate a registration success message.

In S803, the registration success message sent by the cloud is received to determine that registration is completed.

The vehicle may establish a long-lived TCP connection with the cloud to send a registration message to the cloud such that the vehicle is registered at the cloud and may further interact with the cloud to update vehicle voice scene data and give a feedback for voice information input by a user.

Figure 9:
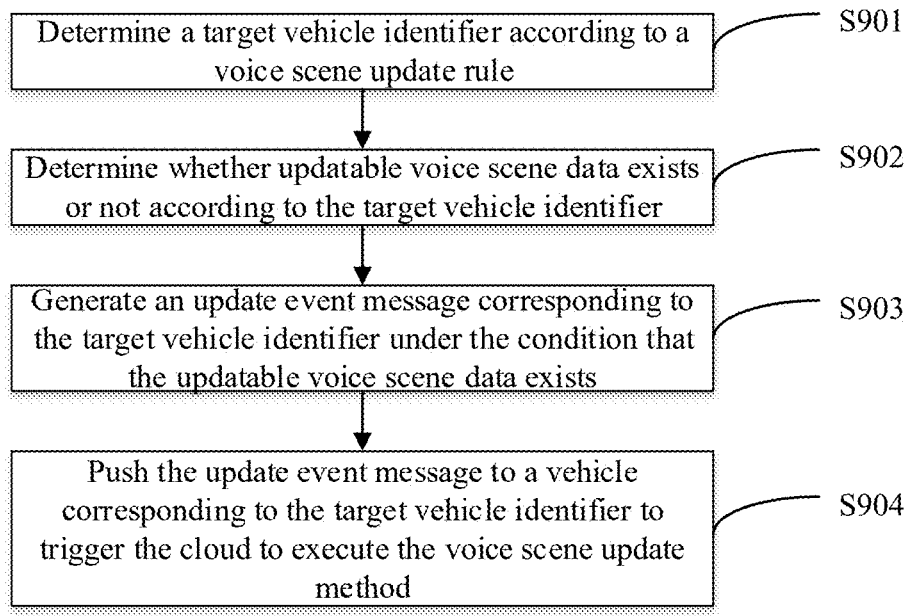
FIG. 9 is a schematic flowchart of another voice scene update method according to embodiment 2 of the present application.

FIG. 9 is a schematic flowchart of another voice scene update method according to embodiment 2 of the present application. As shown in FIG. 9, the method may include the following steps.

In S901, a target vehicle identifier is determined according to a voice scene update rule, wherein the voice scene update rule includes vehicle type information and a combination relationship of the vehicle type information, and the vehicle type information is in correspondence to a vehicle identifier.

A specific embodiment of determining the target vehicle identifier may refer to the descriptions in the above-mentioned embodiment, and will not be elaborated herein.

In S902, whether the updatable voice scene data exists or not is determined according to the target vehicle identifier.

In an embodiment, step S902 may include that: version information of vehicle voice scene data and version information of at least one piece of cloud voice scene data are obtained according to the target vehicle identifier; and it is determined that the updatable voice scene data exists under the condition that the at least one piece of cloud voice scene data includes cloud voice scene data whose version information is newer than that of the vehicle voice scene data.

Obtaining the version information of the vehicle voice scene data and the version information of the at least one piece of cloud voice scene data and determining the updatable voice scene data may refer to some specific embodiments in the above-mentioned embodiment, and will not be elaborated herein.

In S903, an update event message corresponding to the target vehicle identifier is generated under the condition that the updatable voice scene data exists.

In S904, the update event message is pushed to a vehicle corresponding to the target vehicle identifier to trigger the cloud to execute the method of any above-mentioned implementation mode.

For example, in step S904, steps S301 to S305 may be triggered to be executed, or the other voice scene update method in the above-mentioned implementation modes may be triggered. Some specific embodiments of the voice scene update method triggered in step S904 refer to embodiment 1, and will not be elaborated herein.

According to the method of the embodiment of the present application, after pushing the update event message to the vehicle, the cloud may generate new cloud voice scene data, and re-determine updatable voice scene data and target voice scene data according to an update request sent by the vehicle. The new cloud voice scene data may be determined as the target voice scene data. For example, when the vehicle voice scene data is navigation/0_*_*/*.xml, and the cloud voice scene data is navigation/1_*_*/*.xml, navigation/2_*_*/*.xml, and navigation/3_*_*/*.xml, the cloud may determine according to the target vehicle identifier that updatable voice scene data navigation/1_*_*/*.xml, navigation/2_*_*/*.xml, and navigation/3_*_*/*.xml exists. After the cloud pushes an update event message to the vehicle, there is additional cloud voice scene data navigation/4_*_*/*.xml. When the cloud receives an update request, newly obtained version information of cloud voice scene data is 0, 1, 2, 3, and 4, and newly found version information of vehicle voice scene data is still 0. Therefore, newly determined updatable voice scene data is navigation/1_*_*/*.xml, navigation/2_*_*/*.xml, navigation/3_*_*/*.xml, and navigation/4_*_*/*.xml. In such case, target voice scene data of the latest version navigation/4_*_*/*.xml may be sent to the vehicle. Therefore, the cloud may timely provide the target voice scene data of the latest version for the vehicle, and then the vehicle may implement cross-version update, improving the updating efficiency.

Exemplarily, the voice scene update rule may contain update time. Sending an update time message to a target vehicle may include: sending the update event message to the target vehicle at preset update time. Therefore, the vehicle may be triggered to update the vehicle voice scene data within the update time.

In an example, the update time may be a specified time point, or a specified time period. The time point may be specific time on a specific date, such as 15:00 on Apr. 20, 2020. The time period may be a specified time period in a specific month of a year, such as 00:00 on Apr. 20, 2020, to 00:00 on Dec. 20, 2020.

Figure 10:
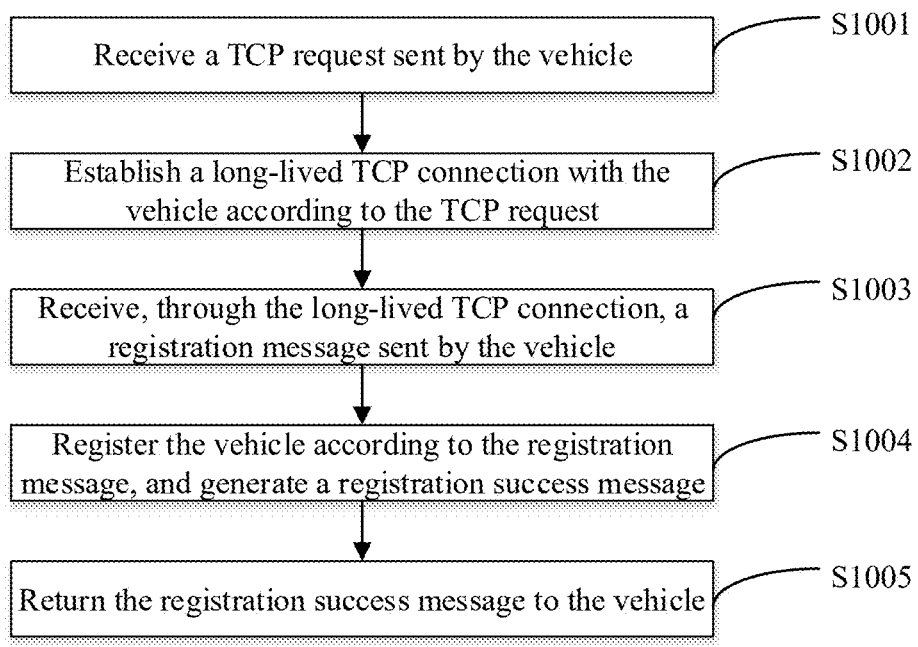
FIG. 10 is a schematic flowchart of TCP connection in another implementation mode according to embodiment 2 of the present application.

In an embodiment, as shown in FIG. 10, before the step that the update event message is pushed to a vehicle corresponding to the target vehicle identifier, the method may further include the following steps.

In S1001, a TCP request sent by the vehicle is received.

In S1002, a long-lived TCP connection is established with the vehicle according to the TCP request.

In S1003, a registration message sent by the vehicle is received through the long-lived TCP connection.

In S1004, the vehicle is registered according to the registration message, and a registration success message is generated.

The registration message may include a vehicle identifier. The step that the vehicle is registered according to the registration message may include that: the vehicle identifier in the registration message is labeled to allow pushing the update event message.

In S1005, the registration success message is returned to the vehicle.

Before pushing the update event message, the cloud may receive, through the long-lived TCP connection, the registration message sent by the vehicle, and register the vehicle. Therefore, when generating the update event message, the cloud may actively push the update event message to the vehicle corresponding to the vehicle identifier according to the labeled vehicle identifier to trigger the vehicle for update.

Figure 11:
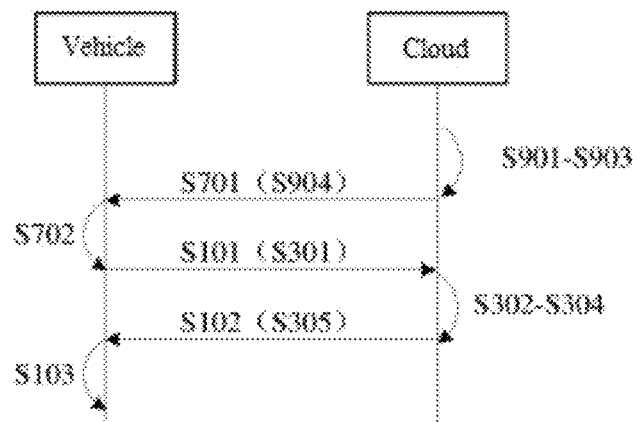
FIG. 11 is a schematic flowchart of interaction between a vehicle and a cloud in an implementation mode according to embodiment 2 of the present application.

FIG. 11 is a schematic flowchart of interaction between a vehicle and a cloud in embodiment 2 of the present application. This embodiment may refer to the description of the above-mentioned voice scene update method in combination with FIGS. 1, 3, 7, and 9. Some other specific embodiments of the interaction method between the vehicle and the cloud may refer to the description of the other above-mentioned embodiments, and will not be elaborated herein.

Embodiment 3

In the method in embodiment 3 of the present application, a cloud directly sends target voice scene data to a vehicle to update vehicle voice scene data. Implementation modes of embodiment 3 of the present application will be specifically described below, and technical details that are not described in detail may refer to the above-mentioned embodiment.

Figure 12:
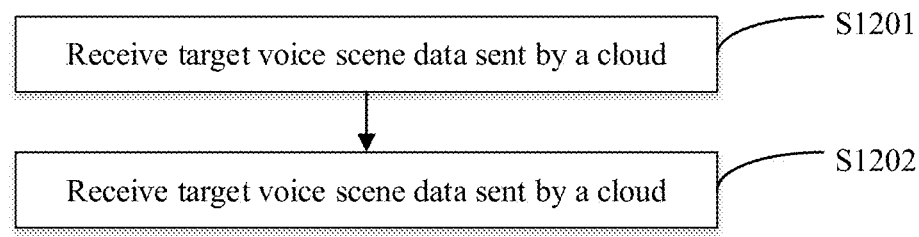
FIG. 12 is a schematic flowchart of a voice scene update method according to embodiment 3 of the present application.

FIG. 12 is a schematic flowchart of a voice scene update method according to embodiment 3 of the present application. As shown in FIG. 12, the method may be applied to a vehicle and include the following steps.

In S1201, target voice scene data sent by a cloud is received, the target voice scene data being determined by the cloud under the condition of determining that the updatable voice scene data exists after obtaining, under the condition of monitoring that the vehicle is on-line, version information of vehicle voice scene data and version information of at least one piece of cloud voice scene data in real time to determine whether the updatable voice scene data exists or not, wherein the at least one piece of cloud voice scene data includes new-version cloud voice scene data obtained by updating original-version cloud voice scene data on the basis of no-feedback voice information, and the no-feedback voice information is a voice that no feedback is capable of being given for on the basis of the vehicle voice scene data. Step S1201 may include the following steps.

In S1211, an update event message sent by the cloud is received.

In S1212, whether to perform voice scene update or not is confirmed according to the update event message.

The update event message may include version information and related description of the updatable voice scene data. The update event message may be displayed by the vehicle for a user to select.

In S1222, an update confirmation message is sent to the cloud under the condition of confirming to perform voice scene update, such that the cloud transmits the target voice scene data.

In S1232, an update cancellation message is sent to the cloud under the condition of confirming not to perform voice scene update.

In S1202, the vehicle voice scene data is updated into the target voice scene data.

Figure 13:
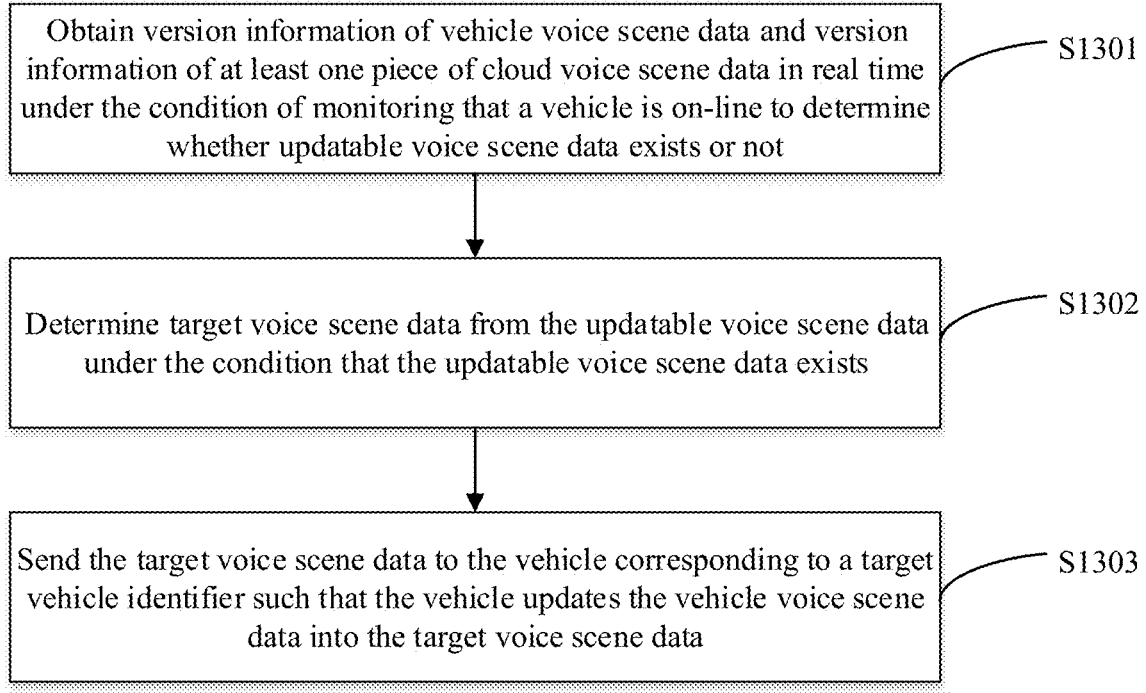
FIG. 13 is a schematic flowchart of another voice scene update method according to embodiment 3 of the present application.

FIG. 13 is a schematic flowchart of another voice scene update method according to embodiment 3 of the present application. As shown in FIG. 13, the method may be applied to a cloud and include the following steps.

In S1301, version information of vehicle voice scene data and version information of at least one piece of cloud voice scene data are obtained in real time under the condition of monitoring that a vehicle is on-line to determine whether the updatable voice scene data exists or not, wherein the at least one piece of cloud voice scene data includes new-version cloud voice scene data obtained by updating original-version cloud voice scene data on the basis of no-feedback voice information, and the no-feedback voice information is a voice that no feedback is capable of being given on the basis of the vehicle voice scene data.

In S1302, target voice scene data is determined from the updatable voice scene data under the condition that the updatable voice scene data exists.

In an embodiment, step S1302 may include the following steps.

In S1312, an update event message is sent to the vehicle under the condition that the updatable voice scene data exists to confirm with the vehicle whether to perform update, wherein the update event message is generated on the basis of a target vehicle identifier.

It is determined that voice scene update is required if an update confirmation message sent by the vehicle is received.

It is determined that voice scene update is not performed if an update cancellation message sent by the vehicle is received.

In S1322, target voice scene data is determined from the updatable voice scene data according to the update confirmation message sent by the vehicle.

Based on this, the cloud may confirm with the vehicle under the condition of determining in real time that the updatable voice scene data exists to send the target voice scene data to the vehicle as required by the vehicle. Therefore, the user experience is improved.

In S1303, the target voice scene data is sent to the vehicle corresponding to a target vehicle identifier such that the vehicle updates the vehicle voice scene data into the target voice scene data.

Some specific embodiments of steps the same as or similar to those in embodiment 1 and embodiment 2 in the voice scene update method in embodiment 3 of the present application may refer to the specific descriptions in embodiment 1 and embodiment 2, and will not be elaborated herein. Embodiment 3 of the present application differs from embodiment 1 and embodiment 2 as follows: the vehicle may directly receive the target voice scene data transmitted by the cloud and update the vehicle voice scene data. Therefore, the updating efficiency of the vehicle may be improved.

The cloud may directly determine whether the updatable voice scene data exists or not under the condition of monitoring that the vehicle is on-line, and directly determine the target voice scene data from the updatable voice scene data for transmission to the vehicle. Therefore, the efficiency of determining the target voice scene data may be improved.

Figure 14:
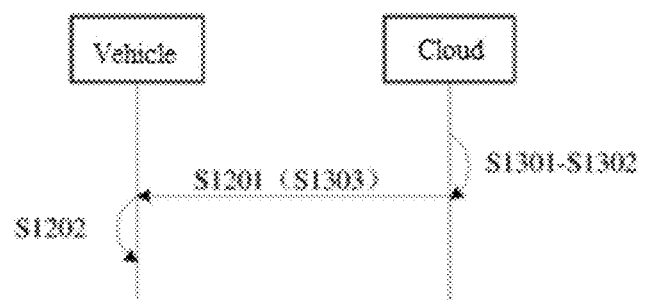
FIG. 14 is a schematic flowchart of interaction between a vehicle and a cloud in an implementation mode according to embodiment 3 of the present application.

FIG. 14 is a schematic flowchart of interaction between a vehicle and a cloud in embodiment 3 of the present application. This implementation mode may refer to the description of the above-mentioned voice scene update method in combination with FIGS. 12 and 13. Some other specific embodiments of the interaction method between the vehicle and the cloud may refer to the description of the embodiment 1 and embodiment 2, and will not be elaborated herein.

The embodiment of the present application also provides a voice scene data update system, including a vehicle and a cloud. The vehicle is configured to execute any above-mentioned voice scene data update method, specifically by voice service running in the vehicle. For example, the voice service sends an update request to the cloud, receives target voice scene data, and processes the target voice scene data. The cloud is configured to execute any above-mentioned voice scene data update method, for example, receiving the update request, determining the target voice scene data, and sending the target voice scene data to the vehicle.

Figure 15:
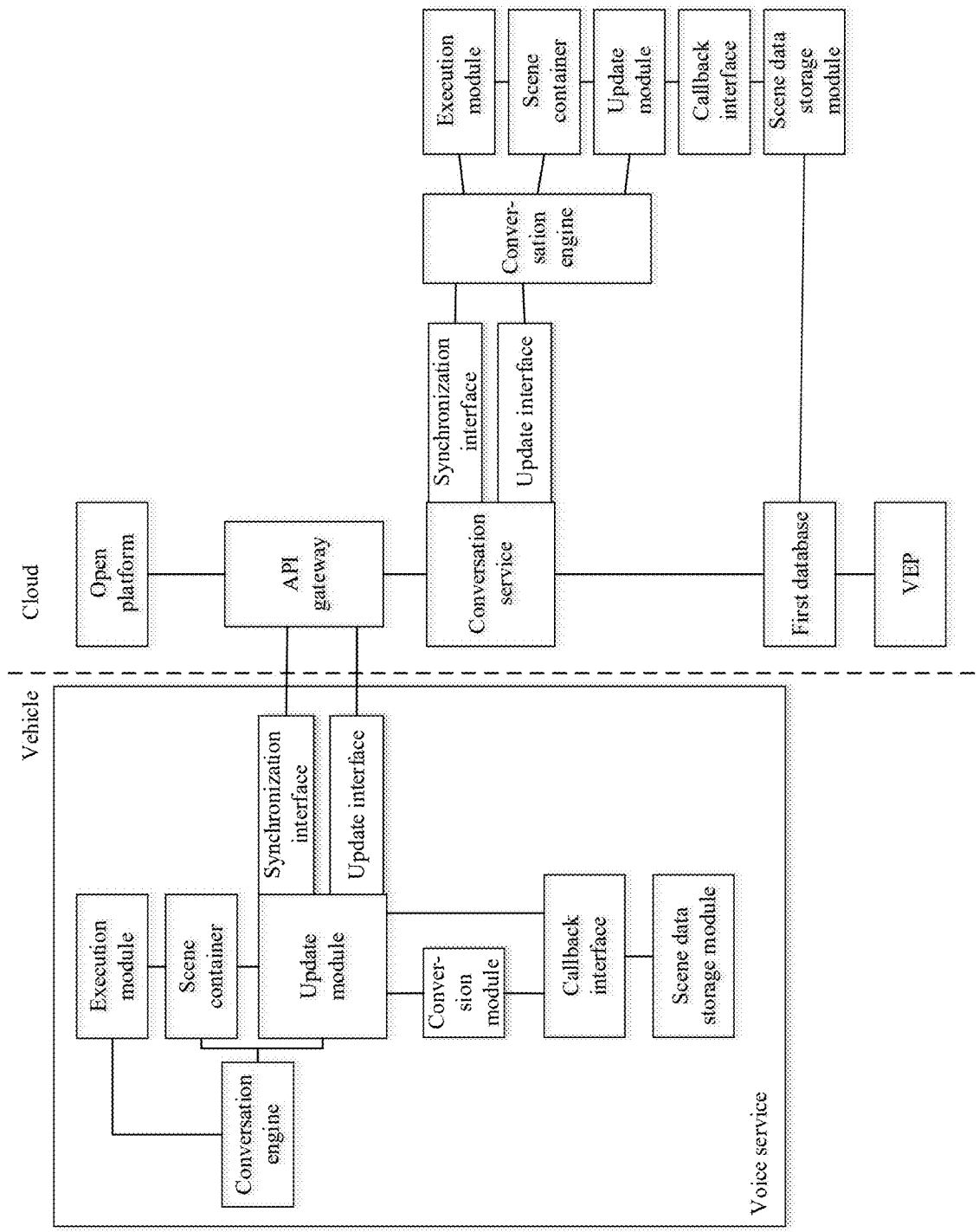
FIG. 15 is a schematic architectural diagram of a voice scene update system according to an embodiment of the present application.

The system of the embodiment of the present application will be described below with a system framework as an example. FIG. 15 is a schematic architectural diagram of a voice scene update system according to an embodiment of the present application. The vehicle and cloud in the system architecture may execute the following steps.

In (1), a user may edit a voice scene flow as required through an VEP of the cloud, and convert the voice scene flow into normalized semantics to further generate corresponding voice scene data according to the normalized semantics. A correspondence between the voice scene flow and the normalized semantics is stored in a first database. The voice scene flow may be in one-to-one correspondence or one-to-many correspondence to the normalized semantics. For example, the voice scene flow may be "I want to look at the stars", "look at the stars", "star", etc., and all of these voice scene flows may be converted into normalized semantics "star" to further generate navigation scene data corresponding to the normalized semantics "star".

In (2), the user may also configure, through the VEP of the cloud, a white list allowed to perform voice scene data update and/or a blacklist not allowed to perform voice scene data update. Vehicle identifiers may be stored in the white list and the blacklist.

In (3), a conversation engine of the cloud may call an update module to load complete-version cloud voice scene data from a scene data storage module, parse the complete-version cloud voice scene data into executable voice scene data, and store the executable voice scene data in a scene container of the cloud, such that the cloud receives voice information of the user, and generates and outputs feedback information for the voice information of the user according to the executable voice scene data in the scene container.

In (4), when the vehicle is powered on, a conversation engine of the vehicle may call an update module such that a conversion module loads vehicle voice scene data from a scene data storage module of the vehicle, converts the vehicle voice scene data into executable voice scene data, and stores the executable voice scene data in a scene container of the vehicle to give a feedback for the voice information of the user.

In (5), the conversation engine of the vehicle calls an update interface of the update module to send an update request to the cloud, the update request being used for enabling the cloud to call an update interface of conversation service of the cloud through an Application Programming Interface (API) gateway to load version information of the vehicle voice scene data and version information of at least one cloud voice scene data from the first database of the cloud to determine target voice scene data.

The version information of the vehicle voice scene data may be stored in the first database in form of a version list, and the conversation service may further load the version list from the first database.

In (6), the update module of the vehicle receives the target voice scene data, and stores the target voice scene data in the scene data storage module.

In (7), the update module of the vehicle calls a callback interface such that the conversion module of the vehicle loads the target voice scene data, converts the target voice scene data into executable voice scene data, and stores the executable voice scene data in the scene container of the vehicle, and an execution module of the vehicle further generates feedback information for the voice information of the user according to the executable voice scene data in the scene container of the vehicle, and outputs the feedback information through the conversation engine.

In (8), after completing voice scene update, the vehicle cooperates with the cloud to generate feedback information for the voice information of the user, and outputs the feedback information through the conversation engine of the vehicle.

The operation that the vehicle cooperates with the cloud to generate feedback information for the voice information of the user may include that:

when the vehicle receives the voice information of the user, the update module of the vehicle forwards the voice information of the user to the cloud such that the execution module of the vehicle and an execution module of the cloud generate first feedback information and second feedback information for the voice information of the user respectively;

when the vehicle receives the second feedback information through the update module, the conversation engine of the vehicle recognizes types of the first feedback information and the second feedback information according to a preset arbitration rule;

if it is recognized that the types of the first feedback information and the second feedback information are an off-line type, the second feedback information is discarded, and the first feedback information is output through the conversation engine of the vehicle; and if it is recognized that the types of the first feedback information and the second feedback information are an on-line type, the first feedback information is discarded, and the conversation engine of the vehicle outputs the second feedback information is output.

For example, when the voice information of the user is voice information of querying the weather, a recognition result is the on-line type, and the vehicle outputs, through the update module, the feedback information generated by the cloud. When the voice information of the user is "I want to look at the stars", the recognition result is the off-line type, and the vehicle outputs, through the update module, the feedback information generated by the vehicle.

Based on this, after completing voice scene update, the vehicle may cooperate with the cloud to generate feedback information for the voice information of the user. Therefore, the quality of voice scene interaction service is improved.

In an embodiment, step S201 may include that: a synchronization interface of an update module of the vehicle is called to send the synchronization request to the cloud, wherein the synchronization request is used for enabling the cloud to call a synchronization interface of conversation service of the cloud through an API gateway to synchronize the version information of the vehicle voice scene data and update a mapping relationship between a vehicle identifier and version information of vehicle voice scene data in a first database of the cloud.

Step S202 may include that: the update module of the vehicle calls a callback interface of the vehicle according to the synchronization success message such that a conversion module of the vehicle loads the target voice scene data from a scene data storage module of the vehicle to convert the target voice scene data into executable voice scene data.

Step S203 may include that: the update module of the vehicle calls a callback interface of the vehicle such that the conversion module of the vehicle loads the vehicle voice scene data from the scene data storage module of the vehicle; and the conversion module of the vehicle converts the loaded vehicle voice scene data into the executable voice scene data, and stores the executable voice scene data in a scene container.

In an embodiment, step S301 may include that: the cloud parses the update request through an API gateway; and the API gateway calls an update interface of conversation service of the cloud according to the parsed update request.

Step S302 may include that: the conversation service of the cloud obtains the version information of the at least one piece of cloud voice scene data and the version information of the vehicle voice scene data from a first database of the cloud on the basis of calling of the API gateway.

Step S303 may include that: the conversation service of the cloud determines whether version information newer than the version information of the vehicle voice scene data exists in the version information of the at least one piece of cloud voice scene data or not on the basis of the version information of the at least one piece of cloud voice scene data and the version information of the vehicle voice scene data.

Step S304 may include that: the conversation service of the cloud calls a conversation engine according to the newer version information such that the conversation engine calls a callback interface of an update module of the loud to load the cloud voice scene data corresponding to the newer version information from a scene data storage module of the cloud; and the loaded cloud voice scene data is determined as the updatable voice scene data.

In an embodiment, step S401 may include that: the synchronization request is parsed through the API gateway; and a synchronization interface of the conversation service of the cloud is called according to the parsed synchronization request to update a mapping relationship between a vehicle identifier and version information of vehicle voice scene data in the first database of the cloud to synchronize the mapping relationship of the cloud with the vehicle voice scene data.

Figure 16:
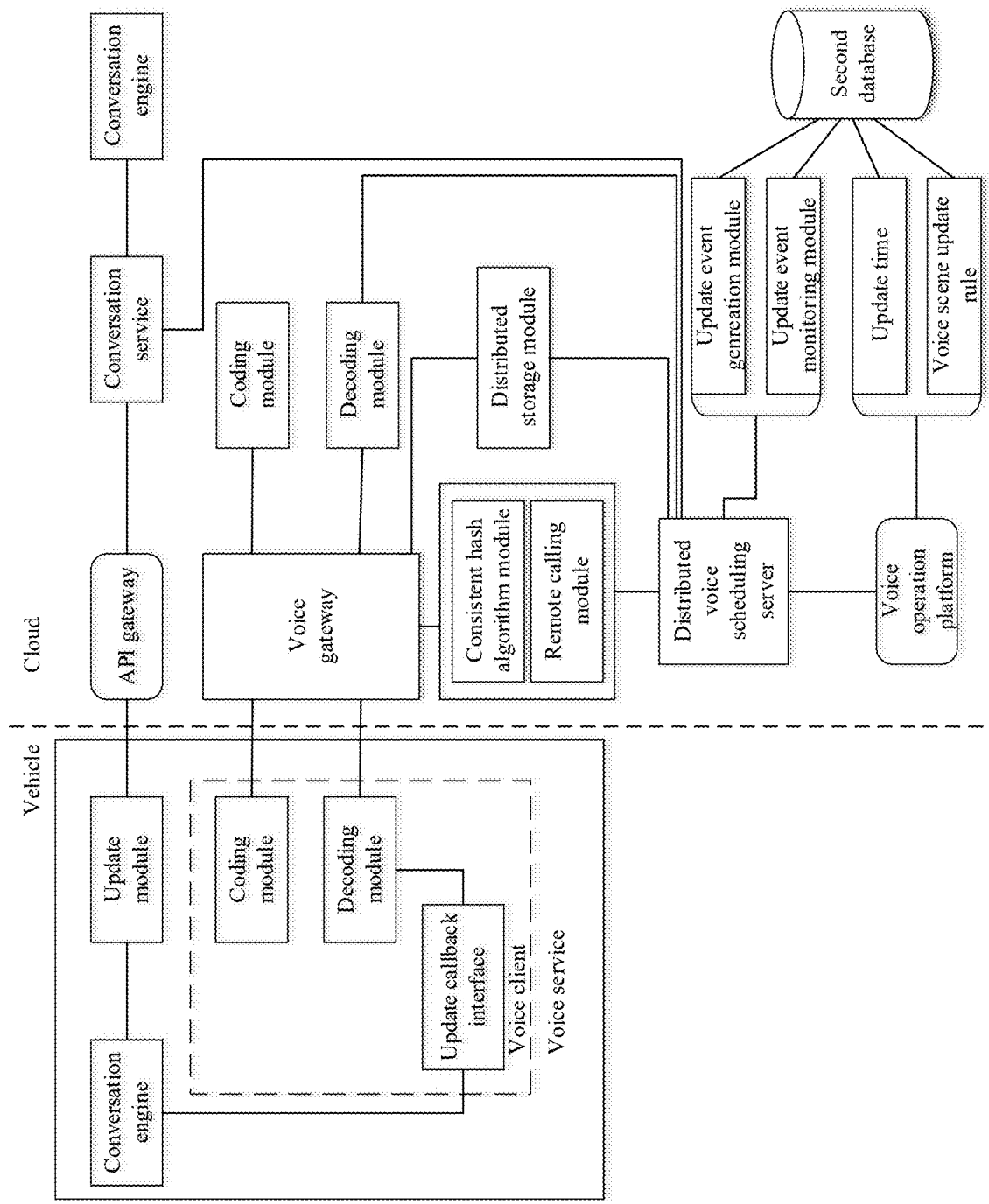
FIG. 16 is another schematic architectural diagram of a voice scene update system according to an embodiment of the present application.

FIG. 16 is another schematic architectural diagram of a voice scene update system according to an embodiment of the present application. The voice service of the vehicle may have a voice client, and the cloud has a voice gateway. The vehicle establishes a long-lived TCP connection with the voice gateway of the cloud through the voice client.

Exemplarily, step S701 may include that: the vehicle receives, through a decoding module in the voice client, the update event message sent by the cloud.

Step S702 may include that: the decoding module of the vehicle decodes the update event message, and calls an update callback interface to send an update request to further trigger the method of any implementation mode in embodiment 1 to be triggered.

In an embodiment, the user may set the voice scene update rule and update time contained therein through a voice operation platform for storage in a second database of the cloud.

Step S901 may include that: when a distributed voice scheduling server is powered on, an update event generation module is caused to load the voice scene update rule from the second database of the cloud to determine the target vehicle identifier.

Step S902 may include that: the distributed voice scheduling server of the cloud may call the update interface of the conversation service of the cloud according to the target vehicle identifier to determine whether the updatable voice scene data exists or not.

Step S903 may include that: the distributed voice scheduling server of the cloud schedules the update event generation module to generate the update event message corresponding to the target vehicle identifier when receiving a determining result returned by the conversation service that indicates that the updatable voice scene data exists.

Step S904 may include that: the distributed voice scheduling server of the cloud monitors the update event message through an update event monitoring module, and when monitoring the update event message, calls the voice gateway to push the update event message to the vehicle.

In an embodiment, the cloud, after determining the target vehicle identifier, may further directly determine and transmit, to the vehicle, the target voice scene data on the basis of the target vehicle identifier.

In this embodiment, methods for determining the target vehicle identifier and the updatable voice scene data differ from the above-mentioned implementation modes as follows.

Step S1302 may include that: the distributed voice scheduling server may call the conversation service to directly determine the target voice scene data from the updatable voice scene data under the condition that the conversation service of the cloud determines that the updatable voice scene data exists.

Step S1303 may include that: the conversation service of the cloud calls the API gateway to send the target voice scene data to the vehicle corresponding to the target vehicle identifier such that the vehicle updates the vehicle voice scene data into the target voice scene data.

Figure 17:
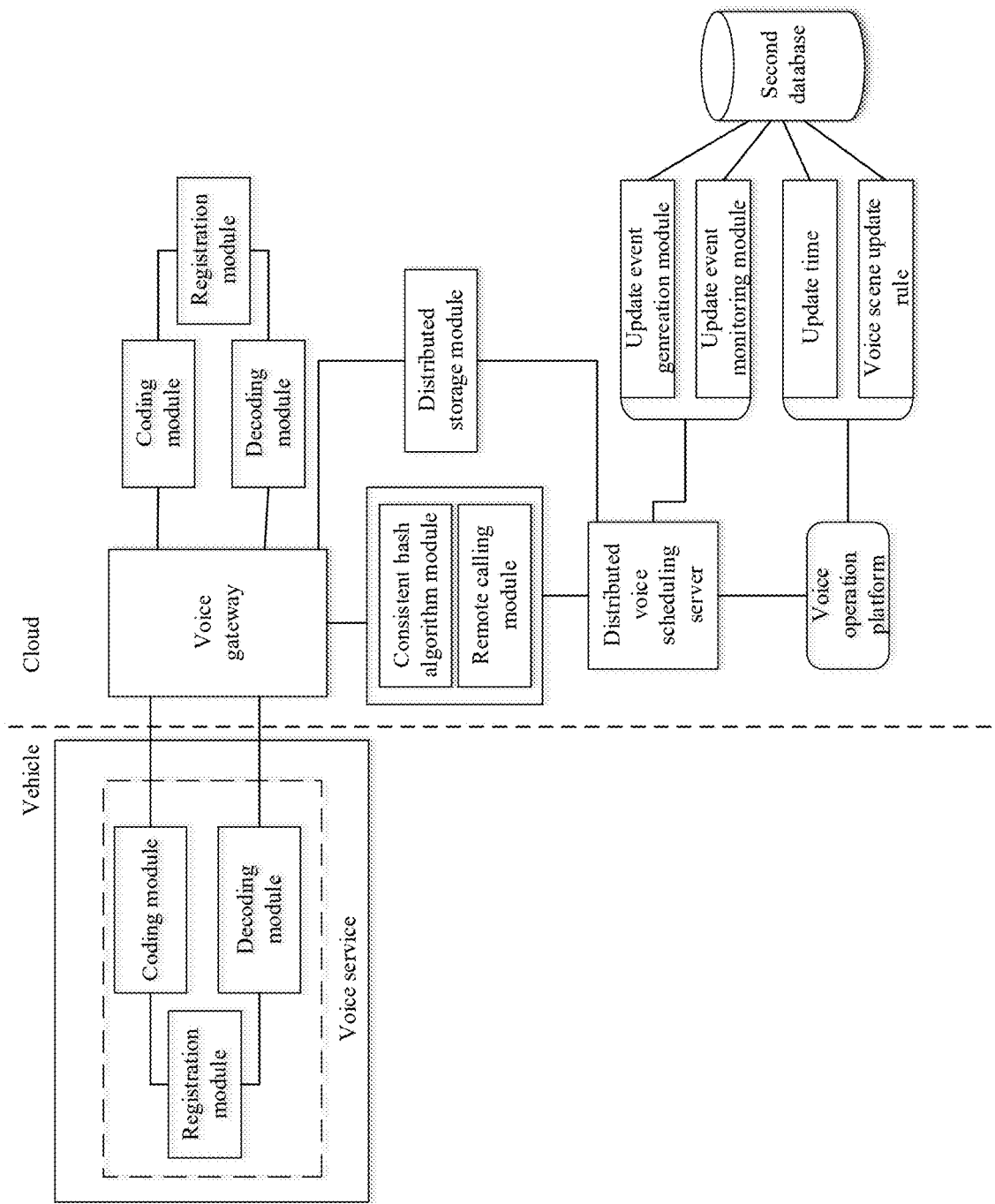
FIG. 17 is yet another schematic architectural diagram of a voice scene update system according to an embodiment of the present application.

FIG. 17 is yet another schematic architectural diagram of a voice scene update system according to an embodiment of the present application. Each of the vehicle and cloud of the system has a registration module such that the cloud registers the vehicle.

Implementation modes of the embodiment of the present application will be described below in combination with FIG. 17, and technical details that are not described in detail may refer to the above-mentioned embodiment.

In an embodiment, as shown in FIG. 17, the cloud may include may include:
  a voice gateway, configured to, under the condition of monitoring an Internet Protocol (IP) address of a server, generate multiple virtual IP addresses corresponding to the IP address of the server using a consistent hash algorithm, and map the multiple virtual IP addresses to a hash space; and
  a target server (which may refer to the distributed voice scheduling server in the figure), configured to receive a registration request sent by the voice gateway, and push an update event message to the voice gateway.

The voice gateway is further configured to receive a registration message sent by the vehicle, search the hash space for a virtual IP address of the target server according to the registration message of the vehicle to determine an IP address of the target server, send the registration request to the target server according to the IP address of the target server, receive the update event message sent by the target server, and push the update event message to the vehicle.

The target server is further configured to establish, according to a vehicle identifier in the registration request and an IP address of the voice gateway, a mapping relationship between the vehicle identifier and the IP address of the voice gateway, and push the update event message to the voice gateway according to the mapping relationship between the vehicle identifier and the IP address of the voice gateway.

The multiple virtual IP addresses corresponding to the IP address of the server are mapped to the hash space using the consistent hash algorithm. Therefore, the multiple virtual IP addresses are uniformly distributed in the hash space, registration messages are uniformly and dispersedly sent to the server during registration, and the mapping relationship between the vehicle identifier and the IP address of the voice gateway may further be uniformly distributed in the server, achieving the advantages of monotony, dispersion, balance, and the like of pushing of the update event message.

In an embodiment, the voice gateway is further configured to determine a hash value closest to a hash value of a vehicle identifier in the registration message from the hash space, and determine a virtual IP address corresponding to the closest hash value as the virtual IP address of the target server.

In an example, a process of registration of the vehicle by the cloud is described in combination with FIG. 17. The process may be as follows.

After started, the distributed voice scheduling server registers its IP address in a distributed storage module, and monitors an IP address list of the voice gateway.

After started, the voice gateway also registers an IP address of the voice gateway in the distributed storage module, and monitors the distributed voice scheduling server to monitor an IP address list of the distributed voice scheduling server.

Under the condition of monitoring the IP address of the distributed voice scheduling server, the voice gateway generates multiple virtual IP addresses corresponding to the IP address of the server through a consistent hash algorithm module, and maps the multiple virtual IP addresses to a hash space.

When receiving a registration message sent by the vehicle, the voice gateway calculates a hash value of a vehicle identifier in the registration message through the consistent hash algorithm module, addresses a hash value closest to the hash value of the vehicle identifier from the hash space according to the hash value of the vehicle identifier, and determines a virtual IP address corresponding to the closest hash value as a virtual IP address of the target server (description is still made with the distributed voice scheduling server as an example of the target server).

The consistent hash algorithm module determines the IP address corresponding to the distributed voice scheduling server according to a mapping relationship between a virtual IP address and IP address of the distributed voice scheduling server.

The voice gateway sends a registration request to the distributed voice scheduling server using a remote calling module according to the IP address of the distributed voice scheduling server. A distributed voice scheduling module corresponding to the distributed voice scheduling server establishes, according to a vehicle identifier in the registration request and the IP address of the voice gateway, a mapping relationship between the vehicle identifier and the IP address of the voice gateway, and returns a registration success message to the vehicle such that the vehicle updates voice service to an available state to activate the voice service of the vehicle.

The registration request is generated by the registration module of the vehicle, and is sent to the voice gateway by a coding module of the vehicle. After the decoding module of the cloud decodes the registration request, the registration module of the cloud may generate a registration message to search the hash space for the virtual IP address of the distributed voice scheduling server.

It is to be noted that FIGS. 15 to 17 are only exemplary architectures of the voice scene update system of the embodiment of the present application. FIGS. 15 to 17 may be independent architectures that independently execute the methods in the above-mentioned embodiments. Alternatively, FIGS. 15 to 17 may be integrated into a whole architecture to execute all of the methods in the above-mentioned embodiments. No limits are made thereto in the embodiment of the present application.

Embodiment 4

Figure 18:
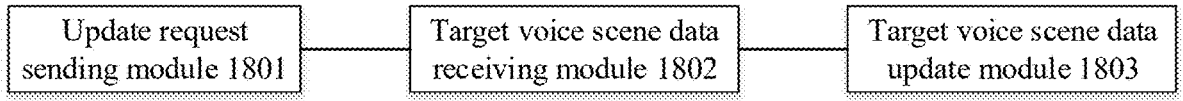
FIG. 18 is a structural block diagram of a voice scene update device according to embodiment 4 of the present application.

FIG. 18 is a structural block diagram of a voice scene update device according to embodiment 4 of the present application. The voice scene update device may include:
an update request sending module 1801, configured to send an update request to a cloud, the update request including a vehicle identifier, and the update request being used for enabling the cloud to obtain version information of vehicle voice scene data and version information of at least one piece of cloud voice scene data in real time to determine whether updatable voice scene data exists or not and determine target voice scene data under the condition that the updatable voice scene data exists, the at least one piece of cloud voice scene data including new-version cloud voice scene data obtained by updating original-version cloud voice scene data on the basis of no-feedback voice information, and the no-feedback voice information being a voice that no feedback is capable of being given for on the basis of the vehicle voice scene data;
a target voice scene data receiving module 1802, configured to receive the target voice scene data returned by the cloud; and
a target voice scene data update module 1803, configured to update the vehicle voice scene data into the target voice scene data.

In an embodiment, the update request sending module 1801 calls an update interface of a vehicle side to send the update request to the cloud, the update request being used for enabling the cloud to call an update interface of a cloud side through an API gateway to obtain the version information of the vehicle voice scene data and the version information of the at least one cloud voice scene data to determine the target voice scene data.

In an embodiment, the target voice scene data update module 1803 may include:
a synchronization request sending submodule, configured to send a synchronization request to the cloud, wherein the synchronization request is used for enabling the cloud to update the version information of the vehicle voice scene data into that of the target voice scene data and generate a synchronization success message;
a synchronization success message receiving submodule, configured to receive the synchronization success message returned by the cloud;
a data conversion submodule, configured to convert the target voice scene data into executable voice scene data; and
a data storage submodule, configured to update the executable voice scene data into a scene container of the vehicle to complete update.

In an example, the target voice scene data update module 1803 may call a synchronization interface of a vehicle side to send the synchronization request to the cloud, wherein the synchronization request is used for enabling the cloud to call a synchronization interface of a cloud side through an API gateway to synchronize the version information of the vehicle voice scene data.

In an example, the target voice scene data update module 1803 may be configured to call a callback interface of a vehicle side according to the synchronization success message to load the target voice scene data.

In an embodiment, the device may further include an executable voice scene data conversion module, configured to convert the vehicle voice scene data into executable voice scene data under the condition that the vehicle is powered on, and store the executable voice scene data in a scene container of the vehicle.

In an example, the executable voice scene data conversion module calls a callback interface of a vehicle side to load the vehicle voice scene data and convert the loaded vehicle voice scene data into the executable voice scene data.

In an embodiment, the device may further include: a user voice receiving module, configured to receive voice information of a user; and a feedback output module, configured to generate and output corresponding feedback information for the voice information of the user according to the executable voice scene data stored in the scene container of the vehicle.

Figure 19:
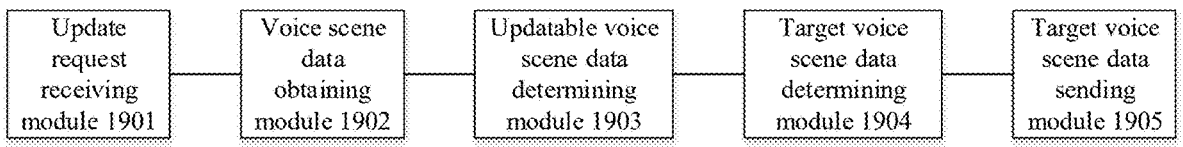
FIG. 19 is a structural block diagram of another voice scene update device according to embodiment 4 of the present application.

FIG. 19 is a structural block diagram of another voice scene update device according to embodiment 4 of the present application. The voice scene update device may include:

- an update request receiving module 1901, configured to receive an update request sent by a vehicle, the update request including a vehicle identifier;
- a voice scene data obtaining module 1902, configured to obtain version information of vehicle voice scene data and version information of at least one piece of cloud voice scene data in real time according to the update request, wherein the at least one piece of cloud voice scene data includes new-version cloud voice scene data obtained by updating original-version cloud voice scene data on the basis of no-feedback voice information, and the no-feedback voice information is a voice that no feedback is capable of being given for on the basis of the vehicle voice scene data;
- an updatable voice scene data determining module 1903, configured to determine whether updatable voice scene data exists or not on the basis of the version information of the vehicle voice scene data and the version information of the at least one piece of cloud voice scene data;
- a target voice scene data determining module 1904, configured to determine target voice scene data under the condition that the updatable voice scene data exists; and
- a target voice scene data sending module 1905, configured to send the target voice scene data to the vehicle such that the vehicle updates the vehicle voice scene data into the target voice scene data.

In an embodiment, the updatable voice scene data determining module 1903 may be configured to determine the cloud voice scene data whose version information is newer than that of the vehicle voice scene data in the at least one piece of cloud voice scene data as the updatable voice scene data.

In an example, the updatable voice scene data determining module 1903 may include: a version information comparison submodule, configured to compare the version information of the at least one piece of cloud voice scene data with that of the vehicle voice scene data to determine whether version information newer than the version information of the vehicle voice scene data exists in the version information of the at least one piece of cloud voice scene data or not; and a first updatable voice scene data determining submodule, configured to determine the cloud voice scene data corresponding to the newer version information as the updatable voice scene data if the version information newer than the version information of the vehicle voice scene data exists.

Exemplarily, the target voice scene data determining module 1904 is configured to determine the target voice scene data from the updatable voice scene data.

In an example, the target voice scene data determining module 1904 may be configured to determine the updatable voice scene data with newest version information in the updatable voice scene data as the target voice scene data.

In an embodiment, the device may further include: a synchronization request receiving module, configured to receive a synchronization request sent by the vehicle; a version information update module, configured to update the version information of the vehicle voice scene data into that of the target voice scene data, and generate a synchronization success message; and a synchronization success message sending module, further configured to send the synchronization success message to the vehicle, the synchronization success message being used for enabling the vehicle to convert the target voice scene data into executable voice scene data.

In an example, the synchronization request receiving module parses the update request through an API gateway. The API gateway calls an update interface of a cloud side according to the parsed update request to obtain the version information of the at least one piece of cloud voice scene data and the version information of the vehicle voice scene data to determine the target voice scene data.

Exemplarily, the updatable voice scene data determining module 1903 may be configured to call a callback interface of a cloud side according to the newer version information to load the cloud voice scene data corresponding to the newer version information, and determine the loaded cloud voice scene data as the updatable voice scene data.

In an embodiment, the version information update module parses the synchronization request through an API gateway, and calls a synchronization interface of a cloud side according to the parsed synchronization request to synchronize the version information of the vehicle voice scene data.

Exemplarily, the device further includes a VEP, configured to edit a voice scene flow to generate the cloud voice scene data.

In an embodiment, the VEP is further configured to configure a white list and a blacklist, such that the voice scene data obtaining module 1902 is configured to obtain the version information of the vehicle voice scene data and the version information of the at least one piece of cloud voice scene data in real time under the condition that the vehicle identifier is found in a white list, and/or stop voice scene update under the condition that the vehicle identifier is found in a blacklist.

Embodiment 5

Figure 20:
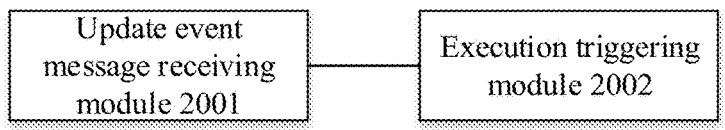
FIG. 20 is a structural block diagram of a voice scene update device according to embodiment 5 of the present application.

FIG. 20 is a structural block diagram of a voice scene update device according to embodiment 5 of the present application. The voice scene update device may include:

- an update event message receiving module 2001, configured to receive an update event message sent by a cloud, the update event message being generated by the cloud according to a target vehicle identifier determined according to a voice scene update rule, the voice scene update rule including vehicle type information and a combination relationship of the vehicle type information, and the vehicle type information being in correspondence to a vehicle identifier; and
- an execution triggering module 2002, configured to trigger the voice scene update method of any above-mentioned implementation mode to be executed according to the update event message.

Figure 21:
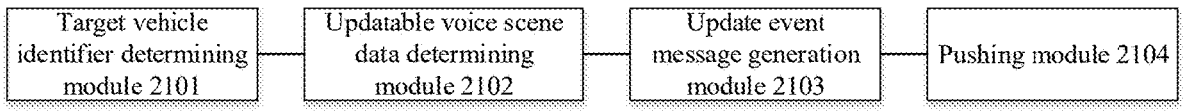
FIG. 21 is a structural block diagram of another voice scene update device according to embodiment 5 of the present application.

FIG. 21 is a structural block diagram of another voice scene update device according to embodiment 5 of the present application. The voice scene update device may include:

- a target vehicle identifier determining module 2101, configured to determine a target vehicle identifier according to a voice scene update rule, wherein the voice scene update rule includes vehicle type information and a combination relationship of the vehicle type information, and the vehicle type information is in correspondence to a vehicle identifier;

an updatable voice scene data determining module 2102, configured to determine whether updatable voice scene data exists or not according to the target vehicle identifier;

an update event message generation module 2103, configured to generate an update event message corresponding to the target vehicle identifier under the condition that the updatable voice scene data exists; and a pushing module 2104, configured to push the update event message to a vehicle corresponding to the target vehicle identifier to trigger the cloud to execute the method of any above-mentioned implementation mode.

Embodiment 6

Figure 22:
FIG. 22 is a structural block diagram of a voice scene update device according to embodiment 6 of the present application.

FIG. 22 is a structural block diagram of a voice scene update device according to embodiment 6 of the present application. The voice scene update device may include:

a target voice scene data receiving module 2201, configured to receive target voice scene data sent by a cloud, wherein the target voice scene data is determined by the cloud under the condition of determining that updatable voice scene data exists after obtaining, under the condition of monitoring that the vehicle is on-line, version information of vehicle voice scene data and version information of at least one piece of cloud voice scene data in real time to determine whether the updatable voice scene data exists or not, the at least one piece of cloud voice scene data includes new-version cloud voice scene data obtained by updating original-version cloud voice scene data on the basis of no-feedback voice information, and the no-feedback voice information being a voice that no feedback is capable of being given for on the basis of the vehicle voice scene data; and a target voice scene data update module 2202, configured to update the vehicle voice scene data into the target voice scene data.

Some specific implementation modes of the target voice scene data receiving module 2201 and the target voice scene data update module 2202 in the embodiment of the present application may refer to the descriptions in the above-mentioned embodiment, and will not be elaborated herein.

In an embodiment, the target voice scene data receiving module 2201 may include: an update event message receiving submodule, configured to receive an update event message sent by the cloud; and an update confirmation submodule, configured to confirm whether to perform voice scene update or not according to the update event message.

The update event message may include version information and related description of the updatable voice scene data. The update event message may be displayed by the vehicle for a user to select.

An update confirmation message sending module is configured to send an update confirmation message to the cloud under the condition of confirming to perform voice scene update, such that the cloud transmits the target voice scene data.

An update cancellation message sending module is configured to send an update cancellation message to the cloud under the condition of confirming not to perform voice scene update.

Figure 23:
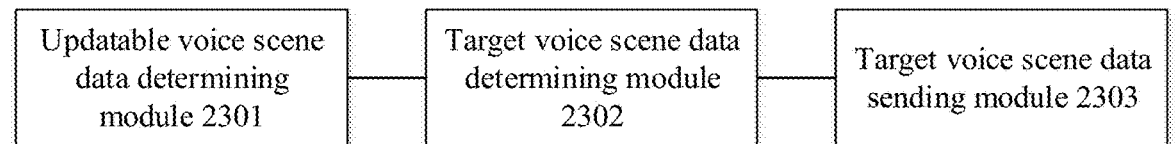
FIG. 23 is a structural block diagram of another voice scene update device according to embodiment 6 of the present application.

FIG. 23 is a structural block diagram of another voice scene update device according to embodiment 6 of the present application. The voice scene update device may include:

an updatable voice scene data determining module 2301, configured to obtain version information of vehicle voice scene data and version information of at least one piece of cloud voice scene data in real time under the condition of monitoring that a vehicle is on-line to determine whether updatable voice scene data exists or not, the at least one piece of cloud voice scene data including new-version cloud voice scene data obtained by updating original-version cloud voice scene data on the basis of no-feedback voice information, and the no-feedback voice information being a voice that no feedback is capable of being given for on the basis of the vehicle voice scene data;

a target voice scene data determining module 2302, configured to determine target voice scene data from the updatable voice scene data under the condition that the updatable voice scene data exists; and a target voice scene data sending module 2303, configured to send the target voice scene data to the vehicle corresponding to a target vehicle identifier such that the vehicle updates the vehicle voice scene data into the target voice scene data. In an embodiment, the target voice scene data determining module 2302 may include: an update event message sending submodule, configured to send an update event message under the condition that the updatable voice scene data exists to confirm with the vehicle whether to perform update, the update event message being generated on the basis of the target vehicle identifier; and a target voice scene data determining submodule, configured to determine the target voice scene data from the updatable voice scene data according to an update confirmation message sent by the vehicle.

The function of each module in each device of the embodiment of the present application may refer to the corresponding descriptions in the method, and will not be elaborated herein.

Figure 24:
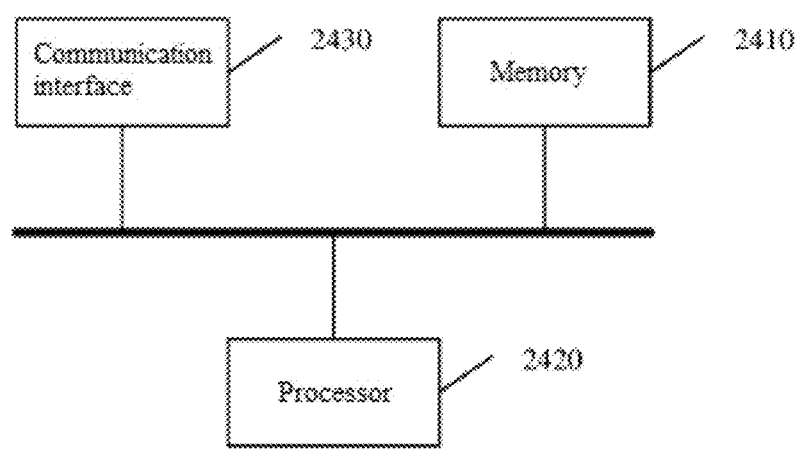
FIG. 24 is a structural block diagram of a terminal or server for implementing a voice scene update method of the embodiment of the present application.

FIG. 24 is a structural block diagram of a terminal or server according to an embodiment of the present application. As shown in FIG. 24, the terminal or server includes a memory 2410 and a processor 2420. An instruction capable of running in the processor 2420 is stored in the memory 2410. The processor 2420 executes the instruction to implement the voice scene data update method in the above-mentioned embodiment. The numbers of the memory 2410 and the processor 2420 may be one or more. The server aims to represent digital computers of various forms, such as a laptop computer, a desktop computer, a work desk, a personal digital assistant, a server, a blade server, a large-scale computer, and other suitable computers. The server may also represent mobile devices of various forms, such as a personal digital assistant, a cell phone, a smartphone, a wearable device, and other similar computing devices. The components shown herein, connections and relationships thereof, and functions thereof are only exemplary and not intended to limit implementation of the present application described and/or required herein.

The server may further include a communication interface 2430, configured to communicate with an external device for interactive data transmission. Various devices are connected with one another by different buses, and may be mounted to a common mainboard or in other manners as required. The processor 2420 may process the instruction executed in the server, including an instruction stored in the memory or on the memory to display graphic information of a Graphical User Interface (GUI) on an external input/output unit (such as a display device coupled to the interface). In another embodiment, multiple processors and/or multiple buses may be used together with multiple memories if necessary. Similarly, multiple servers may be connected, of which each provides part of necessary operations (as, for example, a server array, a group of blade servers, or a multi-processor system). The bus may be divided into an address bus, a data bus, a control bus, etc. For ease of representation, only one bold line is used for representation in FIG. 24, but it does not indicate that there is only one bus or one type of buses.

Optionally, in specific implementation, if the memory 2410, the processor 2420, and the communication interface 2430 are integrated into a chip, the memory 2410, the processor 2420, and the communication interface 2430 may complete communication with one another through an internal interface.

It is to be understood that the processor may be a Central Processing Unit (CPU), or another general-purpose processor, a Digital Signal Processor (DSP), an Application Specific Integrated Circuit (ASIC), a Field Programmable Gate Array (FPGA) or another programmable logic device, a discrete gate or transistor logic device, a discrete hardware component, etc. The general-purpose processor may be a microprocessor, or any conventional processor, etc. It is to be noted that the processor may be a processor supporting an Advanced RISC Machine (ARM) architecture.

The embodiments of the present application provide a computer-readable storage medium (such as the above-mentioned memory 2410), storing a computer instruction executed by a processor to implement the method provided in the embodiments of the present application.

Optionally, the memory 2410 may include a program storage region and a data storage region. The program storage region may store an operating system and an application program required by at least one function. The data storage region may store data created according to use of a server for the voice scene data update method, etc. In addition, the memory 2410 may include a high-speed random access memory, or a nonvolatile memory, such as at least one disk storage device, flash storage device, or another nonvolatile solid-state storage device. In some embodiments, the memory 2410 optionally includes a memory arranged remotely relative to the processor 2420, and the remote memory may be connected to a server for the voice scene data update method through a network. Examples of the network include, but not limited to, the Internet, an intranet of an enterprise, a local area network, a mobile communication network, and a combination thereof.

In the descriptions of the specification, descriptions made with reference to terms "an embodiment", "some embodiments", "example", "specific example", "some examples", or the like refer to that specific features, structures, materials, or characteristics described in combination with the embodiment or the example are included in at least one embodiment or example of the present application. Moreover, the specific described features, structures, materials, or characteristics may be combined in any one or more embodiments or examples as appropriate. In addition, those skilled in the art may integrate and combine different embodiments or examples described in the specification and features of different embodiments or examples without conflicts.

In addition, terms "first" and "second" are only for description and cannot be understood to indicate or imply relative importance or implicitly indicate the number of indicated technical features. Therefore, a feature defined by "first" and "second" may explicitly or implicitly indicate inclusion of at least one such feature. In the descriptions of the present application, "multiple" means two or more than two, unless otherwise limited definitely and specifically.

Any process or method in the flowcharts or described herein in other manners may be understood as representing a module, segment, or part including codes of one or more (two or more) executable instructions for realizing specific logic functions or steps of the process. Moreover, the scope of the preferred implementation mode of the present application includes other implementation, not in a sequence shown or discussed herein, including execution of the functions basically simultaneously or in an opposite sequence according to the involved functions.

Logics and/or steps represented in the flowcharts or described herein in another manner, for example, may be considered as a fixed sequence list of executable instructions for realizing the logic functions, and may specifically be implemented in any computer-readable medium for an instruction execution system, device, or equipment (for example, a computer-based system, a system including a processor, or another system capable of reading instructions from an instruction execution system, device, or equipment and executing the instructions) to use or for use in combination with the instruction execution system, device, or equipment.

It is to be understood that each part of the present application may be implemented by hardware, software, firmware, or a combination thereof. In the above-mentioned embodiments, multiple steps or methods may be implemented by software or firmware stored in the memory and executed by a proper instruction execution system. All or part of the steps in the method of the above-mentioned embodiment may be completed by a program by instructing related hardware. The program may be stored in a computer-readable storage medium. When the program is executed, one or combination of the steps of the method embodiment is included.

In addition, each function unit in each embodiment of the present application may be integrated into a processing module. Alternatively, each unit may physically exist independently. Alternatively, two or more than two units may be integrated into a module. The integrated module may be implemented in a hardware form, or in form of a software function module. When implemented in form of software function module and sold or used as an independent product, the integrated module may be stored in a computer-readable storage medium. The storage medium may be a read-only memory, a magnetic disk, an optical disk, etc.

The above is only the specific implementation mode of the present application and not intended to limit the scope of protection of the present application. Various variations or replacements apparent to those skilled in the art within the technical scope disclosed in the present application shall fall within the scope of protection of the present application. Therefore, the scope of protection of the present application shall be subject to the scope of protection of the claims.

What is claimed is:

1. A voice scene update method, performed by a vehicle, comprising:
sending an update request to a cloud, wherein the update request comprises a vehicle identifier, and the update request enables the cloud to obtain version information of vehicle voice scene data and version information of at least one cloud voice scene data to determine whether updatable voice scene data is available, wherein the cloud obtains the version information of the vehicle voice scene data and the version information of the at least one cloud voice scene data in response to the vehicle identifier being found in a white list, wherein the white list stores vehicle identifiers allowed to update voice scene data;
determining target voice scene data in response to the updatable voice scene data being available;
receiving the target voice scene data returned by the cloud; and
updating the vehicle voice scene data with the target voice scene data, wherein the updating the vehicle voice scene data with the target voice scene data comprises:
sending a synchronization request to the cloud;
in response to the synchronization request, updating, by the cloud, the version information of the vehicle voice scene data with version information of the target voice scene data;
generating a synchronization success message;
receiving the synchronization success message returned by the cloud, wherein the receiving the synchronization success message returned by the cloud further comprises:
calling a callback interface of the vehicle in response to the synchronization success message to load the target voice scene data;
converting the target voice scene data into executable voice scene data; and
updating the executable voice scene data into a scene container of the vehicle to complete update.

2. The method according to claim 1, further comprising:
converting the vehicle voice scene data into the executable voice scene data under a condition that the vehicle is powered on;
storing the executable voice scene data in the scene container of the vehicle;
receiving voice information of a user; and
generating and outputting corresponding feedback information for the voice information of the user according to the executable voice scene data stored in the scene container of the vehicle.

3. The method according to claim 2, wherein the step of converting the vehicle voice scene data into the executable voice scene data comprises:
calling the callback interface of the vehicle to load the vehicle voice scene data;
loading the vehicle voice scene data; and
converting the loaded vehicle voice scene data into the executable voice scene data.

4. The method according to claim 1, wherein the step of sending the update request to the cloud comprises:
calling an update interface of the vehicle to send the update request to the cloud, wherein the update request enables the cloud to call an update interface of the cloud through an Application Programming Interface (API) gateway to obtain the version information of the vehicle voice scene data and the version information of the at least one cloud voice scene data to determine the target voice scene data.

5. The method according to claim 1, wherein the step of sending the synchronization request to the cloud comprises:
calling a synchronization interface of the vehicle to send the synchronization request to the cloud, wherein the synchronization request enables the cloud to call a synchronization interface of the cloud through an Application Programming Interface (API) gateway to synchronize the version information of the vehicle voice scene data.

6. A voice scene update method, performed by a cloud, comprising:
receiving an update request sent by a vehicle, wherein the update request comprises a vehicle identifier;
obtaining version information of vehicle voice scene data and version information of at least one cloud voice scene data according to the update request;
determining whether updatable voice scene data is available based on the version information of the vehicle voice scene data and the version information of the at least one cloud voice scene data, wherein the cloud obtains the version information of the vehicle voice scene data and the version information of the at least one cloud voice scene data in response to the vehicle identifier being found in a white list, wherein the white list stores vehicle identifiers allowed to update voice scene data, wherein the determining whether the updatable voice scene data is available comprises:
determining that version information of a cloud voice scene data of the at least one cloud voice scene data is newer than the version information of the vehicle voice scene data, calling a callback interface of the cloud according to the newer version information to load the cloud voice scene data of the at least one cloud voice scene data which has the newer version information, determining the cloud voice scene data as the updatable voice scene data;
determining target voice scene data in response to the updatable voice scene data being available; and
sending the target voice scene data to the vehicle such that the vehicle updates the vehicle voice scene data with the target voice scene data,
receiving, sent by the vehicle, a synchronization request;
in response to the synchronization request, updating the version information of the vehicle voice scene data with version information of the target voice scene data;
generating a synchronization success message; and
sending the synchronization success message to the vehicle, wherein the synchronization success message enables the vehicle to convert the target voice scene data into executable voice scene data.

7. The method according to claim 6, wherein the step of determining the target voice scene data in response to the updatable voice scene data being available comprises:
determining the target voice scene data from the updatable voice scene data; or
determining the updatable voice scene data with newest version information as the target voice scene data.

8. The method according to claim 6, wherein the step of determining that the version information of the cloud voice scene data of the at least one cloud voice scene data is newer than the version information of the vehicle voice scene data comprises:
comparing the version information of the cloud voice scene data of the at least one cloud voice scene data with the version information of the vehicle voice scene data to determine whether the version information of the cloud voice scene data of the at least one cloud voice scene data is newer than the version information of the vehicle voice scene data; and
in response to the version information of the cloud voice scene data of the at least one cloud voice scene data being newer than the version information of the vehicle voice scene data, determining, the cloud voice scene data of the at least one cloud voice scene data, which has the newer version information, as the updatable voice scene data.

9. The method according to claim 6, wherein the step of receiving the update request sent by the vehicle comprises:
parsing the update request through an Application Programming Interface (API) gateway; and
calling, by the API gateway, an update interface of the cloud according to the parsed update request to obtain the version information of the at least one cloud voice scene data and the version information of the vehicle voice scene data to determine the target voice scene data.

10. The method according to claim 6, wherein the step of receiving the synchronization request sent by the vehicle comprises:
parsing the synchronization request through an Application Programming Interface (API) gateway; and
calling a synchronization interface of the cloud according to the parsed synchronization request to synchronize the version information of the vehicle voice scene data.

11. The method according to claim 6, wherein the at least one cloud voice scene data is generated based on a voice scene flow edited by a Visual Editor Project (VEP) of the cloud.

12. A voice scene update method, simultaneously performed by a vehicle and a cloud, and wherein the method comprises:
sending, by the vehicle and while the vehicle is on-line, an update request to the cloud, wherein the update request comprises a vehicle identifier;
in response to the update request, obtaining, by the cloud while the vehicle is on-line, version information of vehicle voice scene data and version information of at least one cloud voice scene data to determine whether updatable voice scene data is available, wherein the cloud obtains the version information of the vehicle voice scene data and the version information of the at least one cloud voice scene data in response to the vehicle identifier being found in a white list, wherein the white list stores vehicle identifiers allowed to update voice scene data, wherein the determining whether the updatable voice scene data is available comprises:
determining that version information of a cloud voice scene data of the at least one cloud voice scene data is newer than the version information of the vehicle voice scene data, calling a callback interface of the cloud according to the newer version information to load the cloud voice scene data of the at least one cloud voice scene data which has the newer version information, determining the cloud voice scene data as the updatable voice scene data;
determining, by the cloud, target voice scene data in response to the updatable voice scene data being available;
sending, by the cloud, the target voice scene data to the vehicle corresponding to the vehicle identifier;
receiving, by the vehicle, the target voice scene data sent by the cloud, wherein the receiving, by the vehicle, the target voice scene data sent by the cloud comprises:
calling a callback interface of the vehicle in response to a synchronization success message to load the target voice scene data; and
updating, by the vehicle, the vehicle voice scene data with the target voice scene data, wherein the updating the vehicle voice scene data with the target voice scene data comprises:
sending a synchronization request to the cloud;
in response to the synchronization request, updating, by the cloud, the version information of the vehicle voice scene data with version information of the target voice scene data;
generating the synchronization success message;
receiving the synchronization success message returned by the cloud;
converting the target voice scene data into executable voice scene data; and
updating the executable voice scene data into a scene container of the vehicle to complete update.

* * * * *